US012676864B2

(12) United States Patent
Joshi et al.

(10) Patent No.: US 12,676,864 B2
(45) Date of Patent: Jul. 7, 2026

(54) SYSTEMS AND METHODS FOR PROTECTING THE IDENTITY OF USERS AND ENTITIES

(71) Applicant: Wells Fargo Bank, N.A., San Francisco, CA (US)

(72) Inventors: Arushi S. Joshi, San Francisco, CA (US); Ashmita Regmi, San Francisco, CA (US); Anthony Stimola, San Francisco, CA (US); Uma Anupindi, San Francisco, CA (US); Ian T. Staley, San Francisco, CA (US); Anita Sukur, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 73 days.

(21) Appl. No.: 18/929,356

(22) Filed: Oct. 28, 2024

(65) Prior Publication Data

US 2026/0122073 A1     Apr. 30, 2026

(51) Int. Cl.
*H04L 9/32*        (2006.01)
*H04L 9/40*        (2022.01)

(52) U.S. Cl.
CPC .......... *H04L 63/105* (2013.01); *H04L 9/3218* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 9,418,213 B1 * | 8/2016 | Roth | H04L 63/08 |
| 2015/0059003 A1 * | 2/2015 | Bouse | G06F 16/2379 726/28 |
| 2017/0255769 A1 * | 9/2017 | Loughlin-Mchugh | G06F 21/35 |
| 2018/0329980 A1 * | 11/2018 | Ebrahim | G06F 16/287 |
| 2023/0259922 A1 * | 8/2023 | Rao | G06Q 20/3823 |
| 2024/0031341 A1 * | 1/2024 | Robert | H04L 9/0894 |

* cited by examiner

*Primary Examiner* — Fatoumata Traore
(74) *Attorney, Agent, or Firm* — Foley & Lardner LLP

(57)        ABSTRACT

Methods, systems, and computer-readable medium for protecting the identity of users and entities. One method includes receiving an entity profile request, receiving a plurality of attributes associated with one or more members of the entity, and receiving/identifying a plurality of access credentials of the one or more members of the entity. The method includes generating an entity profile including a plurality of member identity passes, generating a GUI including a representation of the entity profile, and receiving a request and at least one of the plurality of access credentials. The request is for an exchange or providing at least one of the plurality of attributes. The method includes verifying that access credentials correspond to an access level to perform the request, accessing a data storage, transmitting or permitting access to information to satisfy the request, and updating a usage log.

20 Claims, 7 Drawing Sheets

114

114

IP

*Verified*

Creating your Identity Pass

114

Done

IP

*Verified*

You can access your Identity Pass in the profile section

114

SYSTEMS AND METHODS FOR PROTECTING THE IDENTITY OF USERS AND ENTITIES

BACKGROUND

Various identity verification methods are used to manage identities of users and entities. Existing systems often exhibit interoperability limitations and require users to manage multiple credentials across different platforms and services. This fragmentation creates an inefficient identification verification process and increases the likelihood of security vulnerabilities.

SUMMARY

Some arrangements relate to a system including a computing system including at least one processor and at least one memory coupled to the at least one processor. The at least one processor is configured to receive an entity profile request for an entity, receive a plurality of attributes associated with one or more members of the entity, and receive or identify a plurality of access credentials of the one or more members of the entity. At least one first access credential of the plurality of access credentials corresponds to a first access level to perform a first set of exchanges or requests, and at least one second access credential of the plurality of access credentials corresponds to a second access level to perform a second set of exchanges or requests. The at least one processor is configured to generate an entity profile including a plurality of member identity passes. At least one first member identity pass of the plurality of member identity passes corresponds to a first member of the one or more members of the entity and at least one second member identity pass of the plurality of member identity passes corresponds to a second member of the one or more members of the entity. The at least one first member identity pass of the plurality of member identity passes includes a first set of identity tokens corresponding with the at least one first access credential of the first member, and the at least one second member identity pass of the plurality of member identity passes includes a second set of identity tokens corresponding with the at least one first access credential of the second member. The at least one first member identity pass and the at least one second member identity pass include the plurality of attributes of the one or more members of the entity. The at least one processor is configured to generate a graphical user interface (GUI) including a representation of the entity profile, the entity profile including one or more interactive elements. Selection of the one or more interactive elements includes updating the representation corresponding with the entity profile based at least on a corresponding access credential of the plurality of access credentials of the one or more members. The at least one processor is configured to receive a request and at least one of the plurality of access credentials corresponding with at least one first identity token of the first set of identity tokens or at least one second identity token of the second set of identity tokens. The request is for an exchange using an exchange instrument, by the one or more members of the entity, or providing at least one of the plurality of attributes of the one or more members of the entity. The at least one processor is configured to verify the at least one of the plurality of access credentials corresponds to an access level to perform the request, and responsive to verifying that the least one of the plurality of access credentials corresponds to the access level to perform the request, access a data storage storing the entity profile. Accessing includes querying for information of the entity corresponding with the at least one first identity token of the first set of identity tokens or the at least one second identity token of the second set of identity tokens. The query returns the information to satisfy the exchange or permit access to at least one of the plurality of attributes. The at least one processor is configured to transmit, to a second computing system, the information to satisfy the exchange or permit access to at least one of the plurality of attributes by the second computing system, and update a usage log of the entity profile corresponding with the request.

In some arrangements, the one or more members of the entity includes a first member associated with a first set of attributes and a first set of access credentials based on the first set of attributes and a second member associated with a second set of attributes and a second set of access credentials based on the first set of attributes. The first set of access credentials is different from the second set of access credentials. In some arrangements, the entity profile is stored on a distributed ledger and the distributed ledger is a semi-private distributed ledger allowing selective access to the distributed ledger. In some arrangements, the at least one processor is further configured to transmit an authentication request for at least one verifiable credential of the one or more members of the entity and verify the at least one verifiable credential based at least on verifying a cryptographic object, an issuer, or a status associated with the at least one verifiable credential of the one or more members of the entity. In some arrangements, the first access level permits access to information associated with the entity and the second access level cannot access the information associated with the entity. In some arrangements, the at least one processor is further configured to receive a request for supplementary information associated with the one or more members of the entity, receive the supplementary information, generate a new identity token including the supplementary information, and update the entity profile based at least on the new identity token. In some arrangements, the at least one processor is further configured to verify, using at least one authentication protocol, the request, and transmit, to the second computing system, the at least one first identity token of the first set of identity tokens or the at least one second identity token of the second set of identity tokens.

One arrangement relates to a method. The method includes receiving an entity profile request for an entity, receiving a plurality of attributes associated with one or more members of the entity, and receiving or identifying a plurality of access credentials of the one or more members of the entity. At least one first access credential of the plurality of access credentials corresponds to a first access level to perform a first set of exchanges or requests and at least one second access credential of the plurality of access credentials corresponds to a second access level to perform a second set of exchanges or requests. The method includes generating an entity profile including a plurality of member identity passes, at least one first member identity pass of the plurality of member identity passes corresponds to a first member of the one or more members of the entity and at least one second member identity pass of the plurality of member identity passes corresponds to a second member of the one or more members of the entity. The at least one first member identity pass of the plurality of member identity passes includes a first set of identity tokens corresponding with the at least one first access credential of the first member, and the at least one second member identity pass of the plurality of member identity passes includes a second set of identity tokens corresponding with the at least one first access credential of the second member. The at least one first member identity pass and the at least one second member identity pass include the plurality of attributes of the one or more members of the entity. The method includes generating a GUI including a representation of the entity profile. The entity profile includes one or more interactive elements, wherein responsive to selection of the one or more interactive elements includes updating the representation corresponding with the entity profile based at least on a corresponding access credential of the plurality of access credentials of the one or more members. The method includes receiving a request and at least one of the plurality of access credentials corresponding with at least one first identity token of the first set of identity tokens or at least one second identity token of the second set of identity tokens. The request is for an exchange using an exchange instrument, by the one or more members of the entity, or providing at least one of the plurality of attributes of the one or more members of the entity. The method includes verifying the at least one of the plurality of access credentials corresponds to an access level to perform the request, and responsive to verifying that the least one of the plurality of access credentials corresponds to the access level to perform the request, accessing a data storage storing the entity profile. Accessing includes querying for information of the entity corresponding with the at least one first identity token of the first set of identity tokens or the at least one second identity token of the second set of identity tokens, and query returns the information to satisfy the exchange or permit access to at least one of the plurality of attributes. The method includes transmitting, to a computing system, the information to satisfy the exchange or permit access to at least one of the plurality of attributes by the computing system and updating a usage log of the entity profile corresponding with the request. In some arrangements, the first member is associated with a first set of attributes and a first set of access credentials based at least on the first set of attributes and the second member is associated with a second set of attributes and a second set of access credentials based at least on the second set of attributes. The first set of access credentials is different from the second set of access credentials.

In some arrangements, the method further includes receiving a request for supplementary information associated with the one or more members of the entity, receiving the supplementary information, generating a new identity token including the supplementary information, and updating the entity profile based at least on the new identity token. In some arrangements, the supplementary information is a tax history or a credit score. In some arrangements, the first access level permits access to information associated with the entity and the second access level cannot access the information associated with the entity. In some arrangements, the entity profile is stored on a distributed ledger and the distributed ledger is a semi-private distributed ledger allowing selective access to the distributed ledger. In some arrangements, the method further includes transmitting an authentication request for at least one verifiable credential of the one or more members of the entity and verifying the at least one verifiable credential based at least on verifying a cryptographic object, an issuer, or a status associated with the at least one verifiable credential of the one or more members of the entity.

One arrangement relates to at least one non-transitory processor-readable medium including processor-readable instructions such that, when executed by at least one processor, causes the at least one processor to receive an entity profile request for an entity, receive a plurality of attributes associated with one or more members of the entity, and receive or identify a plurality of access credentials of the one or more members of the entity. At least one first access credential of the plurality of access credentials corresponds to a first access level to perform a first set of exchanges or requests, and at least one second access credential of the plurality of access credentials corresponds to a second access level to perform a second set of exchanges or requests. The processor-readable instructions further cause the at least one processor to generate an entity profile including a plurality of member identity passes, at least one first member identity pass of the plurality of member identity passes corresponds to a first member of the one or more members of the entity and at least one second member identity pass of the plurality of member identity passes corresponds to a second member of the one or more members of the entity. The at least one first member identity pass of the plurality of member identity passes includes a first set of identity tokens corresponding with the at least one first access credential of the first member, and the at least one second member identity pass of the plurality of member identity passes includes a second set of identity tokens corresponding with the at least one first access credential of the second member. The at least one first member identity pass and the at least one second member identity pass include the plurality of attributes of the one or more members of the entity. The processor-readable instructions further cause the at least one processor to generate a graphical user interface (GUI) including a representation of the entity profile, the entity profile including one or more interactive elements. Selection of the one or more interactive elements includes updating the representation corresponding with the entity profile based at least on a corresponding access credential of the plurality of access credentials of the one or more members. The processor-readable instructions further cause the at least one processor to receive a request and at least one of the plurality of access credentials corresponding with at least one first identity token of the first set of identity tokens or at least one second identity token of the second set of identity tokens. The request is for an exchange using an exchange instrument, by the one or more members of the entity, or providing at least one of the plurality of attributes of the one or more members of the entity. The processor-readable instructions further cause the at least one processor to verify the at least one of the plurality of access credentials corresponds to an access level to perform the request, responsive to verifying that the least one of the plurality of access credentials corresponds to the access level to perform the request, access a data storage storing the entity profile, wherein accessing includes querying for information of the entity corresponding with the at least one first identity token of the first set of identity tokens or the at least one second identity token of the second set of identity tokens. The query returns the information to satisfy the exchange or permit access to at least one of the plurality of attributes. The processor-readable instructions further cause the at least one processor to transmit, to a computing system, the information to satisfy the exchange or permit access to at least one of the plurality of attributes by the computing system, and, update a usage log of the entity profile corresponding with the request.

In some arrangements, the at least one processor is further configured to receive a request for supplementary information associated with the one or more members of the entity, receive the supplementary information, generate a new identity token including the supplementary information, and update the entity profile based at least on the new identity token. In some arrangements, the first access level permits access to information associated with the entity and the second access level cannot access the information associated with the entity. In some arrangements, the at least one processor is further configured to transmit an authentication request for at least one verifiable credential of the one or more members of the entity, and verify the at least one verifiable credential based at least on verifying a cryptographic object, an issuer, or a status associated with the at least one verifiable credential of the one or more members of the entity. In some arrangements, the at least one processor is further configured to verify, using at least one authentication protocol, the request, and transmit, to the computing system, the at least one first identity token of the first set of identity tokens or the at least one second identity token of the second set of identity tokens. In some arrangements, the first member is associated with a first set of attributes and a first set of access credentials based at least on the first set of attributes, the second member is associated with a second set of attributes and a second set of access credentials based at least on the second set of attributes, and the first set of access credentials is different from the second set of access credentials.

Figure 1:
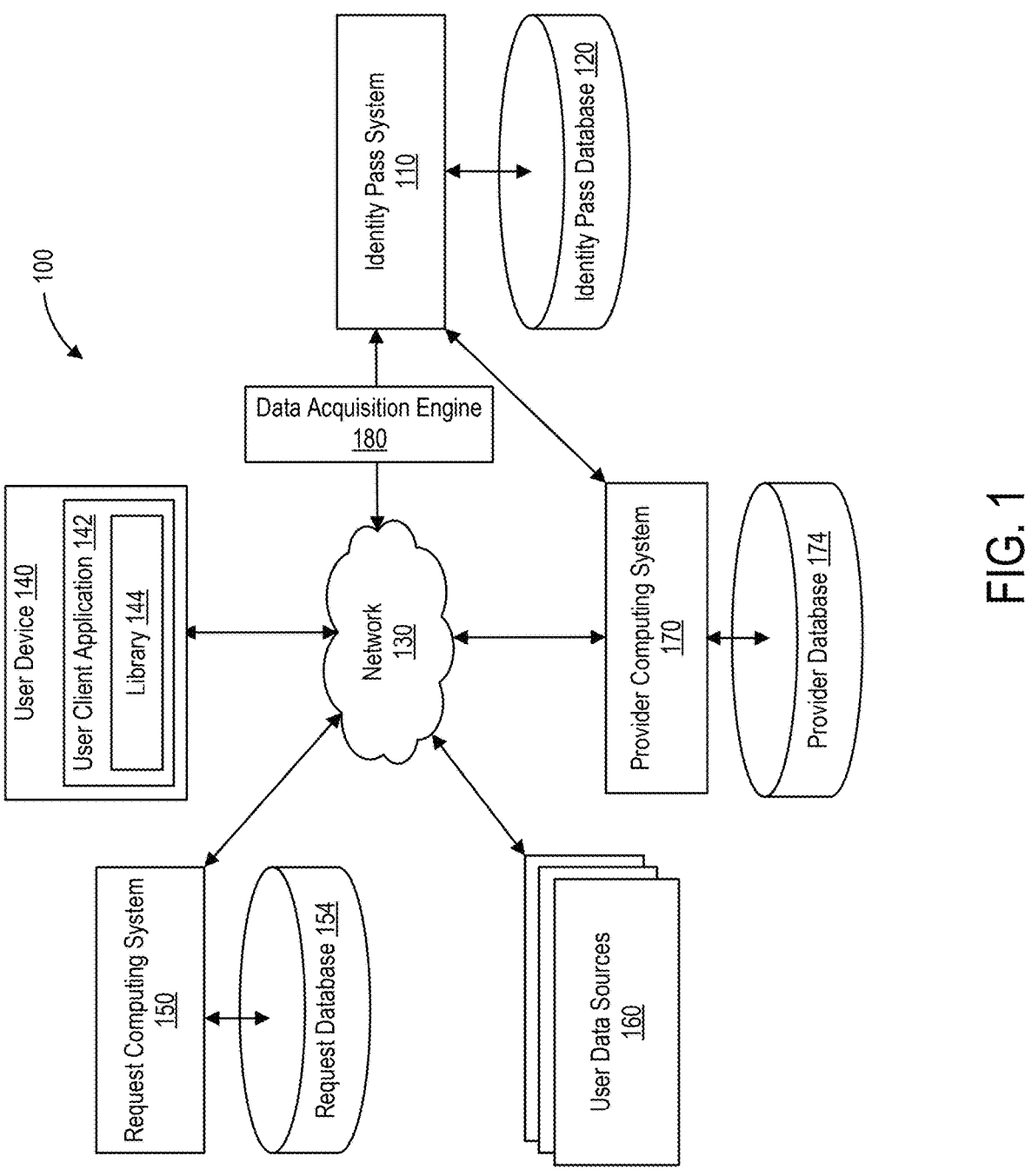
FIG. 1 is a block diagram depicting an example of an identity pass system, according to some arrangements.

It will be recognized that some or all of the figures are schematic representations for purposes of illustration. The figures are provided for the purpose of illustrating one or more arrangements with the explicit understanding that they will not be used to limit the scope or the meaning of the claims.

DETAILED DESCRIPTION

Referring generally to the Figures, the systems and methods described herein relate to an identity pass (e.g., digital identity pass, business identity pass, etc.) that includes digital credentials (e.g., government-issued IDs, educational qualifications, biometric data, company-related information, etc.) and user information for verification and information sharing. The systems and methods disclosed herein are configured for use in identity verification and information sharing processes. In many systems, user information is collected and provided to different provider institutions, platforms, applications, enterprises, individual devices, or entities during transactions or interactions. For example, a user may provide personal information to apply for a financial service. In another example, a user may submit their government-issued ID when registering for an online service. In yet another example, biometric data may be collected by a mobile device to authenticate a user's identity. In some arrangements, a user may have a business identity pass (or member identity pass) associated with their place of work or organization, including additional data about their role, responsibilities, permissions, and access within the organization.

Verifying and sharing user information across different systems introduces security vulnerabilities and inefficiencies in communication and processing. For example, different institutions may require and/or request users to re-submit the same personal data in varying formats, leading to redundant data input and transmission. In another example, integration between platforms may include incompatible systems, resulting in delays in the verification process. In yet another example, decentralized storage across platforms creates technical problems in securely accessing or updating user information across multiple systems. For entities, this complexity increases when managing business identity passes and member identity passes, where multiple member identity passes can correspond to employees or members of an organization, at least one (e.g., each) having unique identity tokens and access credentials associated with their roles.

In some arrangements, users submit personal information across multiple entities, increasing the vulnerability of unauthorized access, data breaches, or identity theft. For example, multiple data points stored in different locations increase the attack surface for malicious entities attempting to compromise sensitive user data. In another example, the transmission of personal information between different systems without sufficient encryption may lead to interception by unauthorized parties. In yet another example, inconsistencies in security measures across institutions create vulnerabilities in the protection of sensitive user data. Accordingly, there is a need for a technical solution that consolidates and integrates digital credentials into a secure identity pass, including business identity passes and member identity passes. The systems and methods described herein reduce redundancies, improve verification efficiencies, and enhance the security of user information across interconnected systems and networks, including managing entity profiles that include a plurality of member identity passes, at least one (e.g., each) associated with different access credentials and identity tokens corresponding to specific members of the entity.

Additionally, the systems and methods described herein relate to an identity pass (e.g., digital identity pass, etc.) including digital credentials (e.g., government-issued IDs, education qualifications, biometric data, etc.) and user information for verification and user information sharing Verifying and sharing user information across different provider institutions, networks, platforms, applications, enterprises, and individual devices, may be inefficient and cumbersome to both users and service providers. The identity pass integrates various credentials and user information, improving the efficiency and convenience of sharing user information across different networks (e.g., institutions, platform, application, enterprises, etc.) and in establishing a verified identity for a user to be shared across the different networks.

The identity pass of a user may be created during initiation of a process, such as a data collection process and/or a risk assessment process. The creation of an identity pass may be user initiated, or initiated by an institution, such as a financial institution. Creating the identity pass may include pulling records and information from various data sources to collect user information. The identity pass may be defined in a decentralized ID document (DID) (e.g., a JavaScript Object Notation (JSON) file, etc.) which includes pointers to documents, systems of record (SORs), biometric, activity logs, verifiable credentials, and the like. The DID may include a description, a set of public keys for verification, a set of authentication methods for authentication, a set of service end points for interaction, a timestamp for audit history, a signature for integrity, and the like.

A user may have multiple identity passes associated with their identity. The various identity passes may be managed centrally or managed separately. A user may have an identity pass for different applications, such as a business, or group identity pass, and a personal identity pass. The business identity pass may be associated with an entity (e.g., a business, an organization, a company, an educational institution, etc.) that the user may be a member of. For example, a user may have a business identity pass associated with their place of work. The user's business identity pass may include additional information about the user as an employee within the organization (e.g., title, permissions, responsibilities, access, relationships, company credit card info, etc.).

Referring to FIG. 1, a block diagram depicting an example of an identity pass system 110 and a computing environment 100 is shown, according to some arrangements. As shown, the computing environment 100 includes the identity pass system 110 coupled to an identity pass database 120. The identity pass system 110 may be coupled, via the data acquisition engine 180, to a plurality of devices and/or systems including, user devices 140, request computing system 150, data sources 160, and a provider (e.g., a provider institution) computing system 170. The plurality of devices and/or systems 140, 150, 170, and/or the data sources 160 may exchange and/or route (e.g., provide) data, information, etc. over a network 130. The data acquisition engine 180 may provide a single application programming interface (API) or multiple APIs to access various data generated, stored, and exchanged by the devices and systems 140, 150, 160, and 170. In various arrangements, the identity pass system 110 and the provider computing system 170 may be implemented as separate systems or integrated within a single system (e.g., provider computing system 170 may be configured to incorporate some or all of the functions/capabilities of the identity pass system 110). In some arrangements, the identity pass database 120 and provider database 174 may be implemented as separate databases or integrated within a single database (e.g., provider database 174 may be configured to store some or all of the data/ datasets of the identity pass database 120).

The user devices 140 may be associated with (e.g., owned by, associated with, or otherwise used by) a user to perform various actions (e.g., initiating a loan application, opening an account, etc.) and/or access various data in which actions may be provided and performed over a network 130. As used herein, the "user" refers to an individual operating the user device 140 who owns, manages, or may be otherwise associated with the user device 140. Thus, as described herein, the user may be a customer of one or more institutions or platforms associated with the request computing system 150. The user device 140 may be used to send data to the identity pass system 110 or may be used to perform various actions, including performing actions at a merchant, accessing applications (e.g., a mobile application), and/or any other action. The user device 140 may be a mobile or stationary computing device including, but not limited to, a mobile phone, a tablet, a laptop, a wearable device, a virtual/augmented reality (VR/AR) device, and/or other suitable mobile user computing devices capable of accessing and communicating using local and/or global networks. Wearable computing devices refer to types of devices that an individual wears, including, but not limited to, a watch (e.g., a smart watch), glasses (e.g., eyeglasses, sunglasses, smart glasses, etc.), bracelet (e.g., a smart bracelet), etc.

The user device 140 may be shown to include a user client application 142 (also referred to herein as a mobile application and/or provider institution client application). The mobile application 142 may be provided by, coupled to, and supported by, at least partially, the provider computing system 170. In another arrangement, the mobile application 142 may be configured as a mobile banking application, which may also be provided, coupled to, and supported, at least partly, by the provider computing system 170. In some arrangements, the mobile application 142 may be a stand-alone application or be incorporated with an existing application of the user device 140 (e.g., integrated into a mobile banking application, a service provider application, etc.). The mobile application 142 may be downloaded by the user device 140 prior to its usage, hard-coded into a memory of the user device 140, or be a network-based or web-based interface application such that the provider computing system 170 may provide a web browser to access the application, which may be executed remotely from the user device 140. For example, the mobile application 142 may be downloaded to the user device 140 and provided by the provider computing system 170 via an app store for download. The mobile application 142 may be structured as a mobile banking application. The mobile application 142 may be developed and maintained (e.g., provided with software updates on a regular or semi-regular basis) by the provider institution via the provider computing system 170. Accordingly, the user device 140 may include software and/or hardware capable of implementing a network-based or web-based application. For example, in some instances, the mobile application 142 includes software such as HTML, XML, WML, SGML, PHP (Hypertext Preprocessor), CGI, and like languages.

In the latter web-based instance, the user may have to log onto or access the web-based interface before usage of the application. Further, and in this regard, the mobile application 142 may be supported by the provider computing system 170 via one or more servers, processors, network interface circuits, etc. that transmit applications for use to the user device 140. Furthermore, prior to use of the mobile application 142 and/or at various points throughout the use of the mobile application 142, the user may provide various authentication information or log-in credentials (e.g., a password, a pass code, a personal identification number (PIN), a fingerprint scan, a retinal scan, a voice sample, a face scan, any other type of biometric security scan) to ensure that the user associated with the user device 140 may be authorized to use the mobile application 142.

The mobile application 142 includes a library 144. The library 144 may be structured as a repository (e.g., a file in the mobile application 142 for storing certain information, instructions in the mobile application 142 for storing certain information in a memory device of the user device 140, etc.). Furthermore, the library 144 may include an API configured for communication with the identity pass system 110, in particular, the user interface 114. In another example, the library 144 may be an SDK that includes an API, a debugger, and IDE, and so on. In some arrangements, the library 144 includes one or more libraries having reusable functions that interface with a particular system software (e.g., iOS, Android, Linux, etc.). The library 144 may facilitate embedding functionality in mobile application 142.

The network 130 may include any combination of a wired and/or wireless network. Therefore, the network 130 local area network (LAN), a wide area network (WAN) (e.g., the Internet), a telephone network, such as the Public Switched Telephone Network (PSTN), a wireless link, an intranet, the Internet, a proprietary banking network, or combinations thereof. The network 130 enable communication between various nodes, such as the identity pass system 110 and user devices 140. In some arrangements, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 may include various network devices (nodes) communicatively linked to form one or more data communication paths between participating devices. At least one (e.g., each) networked device includes at least one network interface for receiving and/or transmitting data, typically as one or more data packets. An illustrative network 130 may be the Internet; however, other networks may be used. The network 130 may be an autonomous system (AS), i.e., a network that may be operated under a consistent unified routing policy (or at least appears to from outside the AS network) and may be generally managed by a single administrative entity (e.g., a system operator, administrator, or administrative group).

Referring to the request computing system 150, at least one (e.g., each) request computing system 150 may be associated with (e.g., owned by, managed by, controlled by, etc.) an institution (e.g., financial institution, educational institution, etc.), such as the provider institution, or one or more merchants. As used herein, a "merchant" refers to a company, business, or other entity including an individual that provides goods and/or services. For example, the merchant may be a hairdresser, restaurant (e.g., bar, dive, diner, etc.), stadium (e.g., hosting sports, concerts, etc.), food truck, wireless phone carrier, movie theater, store (e.g., small, medium, big-box, chain, etc.), and so on. Accordingly, the merchant may be an individual (e.g., small business owner) or a larger entity (e.g., fortune 500 company, business, institution). The request computing system 150 may be configured to receive a request for an exchange (e.g., transaction) using an exchange instrument (e.g., a tool or mechanism that facilitates transactions between parties, payment instrument, credit/debit card, checks, digital wallets, cryptocurrencies, contracts, futures and options, bonds, stocks, mobile payments, credits, securities, exchange-traded funds (ETFs), mortgage instruments, digital currencies, exchange-traded derivatives, agreements, tokenized assets, loans, direct deposits, etc.), or for user information. For example, the request may be a request from the user device 140 for one or more goods and/or services provided by the merchant.

The request computing system 150 may be used to perform various actions and/or access user information, some of which may be provided over the network 130. The request computing system 150 may be used to send and receive data (e.g., exchange information) with the identity pass system 110. The request computing system 150 may include one or more processing circuits or systems that have one or more processors coupled to one or more transitory and/or non-transitory storage mediums and/or memory devices (e.g., any computer-readable storage media, such as a magnetic storage, optical storage, flash storage, RAM, and so on).

The one or more data sources 160 may be one or more computing systems, which are third-parties relative to the request computing system 150 and provider computing system 170, that are configured to provide and store data to at least one of the user device 140, identity pass system 110, or provider computing system 170. The data sources 160 may function as data aggregators, in some arrangements. The data sources 160 may provide information associated with a particular user. User information may include personal identification information, contact information, biometric data, government-issued identifications, digital credentials, licenses, financial information, health information, security information, social profiles, and the like. The data sources 160 may receive an authentication request from the identity pass system 110 to authenticate a verifiable credential. In some arrangements, the data sources 160 may be excluded from the computing environment 100.

The computing environment 100 may be shown to further include a provider computing system 170 associated with (e.g., managed by, controlled by, owned by, etc.) a provider institution. In some arrangements, the provider institution may be a financial institution capable of providing one or more financial products and services, such as providing various accounts, such as a demand deposit account, lending, money transfers, issuing credit and/or debit cards, wealth management, etc. Among other capabilities, the associated provider computing system 170 may be structured to provide or otherwise facilitate providing the one or more financial products and services to customers. As such, the provider institution may also be referred to as a financial institution herein that provides banking services to customers. For example, customers view account balances, apply for loans, and the like, via the provider computing system 170. As described herein, the provider computing system 170 may be structured to support at least some of the functions and services described below. The provider computing system 170 may be implemented using a computing system, such as a discrete server, a group of two or more computing devices/servers, a distributed computing network, a cloud computing network, and/or another type of computing system capable of accessing and communicating using local and/or global networks (e.g., the network 130).

The provider computing system 170 may be configured to send data to and exchange information with the identity pass system 110. The provider computing system 170 may also be configured to store data/information of customers in a provider database 174. Data stored in the provider database 174 may include personal information (e.g., names, addresses, phone numbers, and so on), authentication information (e.g., username/password combinations, device authentication tokens, security question answers, unique client identifiers, biometric data, geographic data, social media data, and so on), and/or financial information (e.g., token information, account numbers, account balances, available credit, credit history, exchange histories, and so on) regarding users and associated accounts of the users.

The provider computing system 170 may include one or more processors (e.g., any general purpose or special purpose processor), and include and/or be operably coupled to one or more transitory and/or non-transitory storage mediums and/or memory devices (e.g., any computer-readable storage media, such as a magnetic storage, optical storage, flash storage, RAM, and so on). The memory device may store instructions, code, logic, program logic, etc. that may be executed by the provider computing system 170 to perform various functions described herein. Thus, the provider computing system 170 may be configured to have various capabilities enabling various functionalities. In various arrangements, it should be appreciated that provider of the provider computing system 170 may own and maintain the identity pass system 110.

The computing environment 100 is shown to include a data acquisition engine 180. In various arrangements, the identity pass system 110 may be communicatively and operatively coupled to the data acquisition engine 180. The data acquisition engine 180 may include one or more processing circuits configured to execute various instructions. In various arrangements, the data acquisition engine 180 may be configured to facilitate communication (e.g., via network 130) between the identity pass system 110, the identity pass database 120, and systems and devices described herein (e.g., user devices 140, request computing system 150, data sources 160, provider computing system 170). Thus, the data acquisition engine 180 may additionally include a network interface, and be structured as an interface for communications between the identity pass system 110 and other systems and components in FIG. 1. In other arrangements, the data acquisition engine 180 may be excluded and the identity pass system 110 communicates directly with the request computing system 150, provider computing system 170, data sources 160, and/or user device 140. Regarding the data acquisition engine 180, the facilitation of communication may be implemented as an application programming interface (API) (e.g., REST API, Web API, customized API), batch files, SDK, and/or queries. In various arrangements, the data acquisition engine 180 may also be configured to control access to resources of the identity pass system 110 and identity pass database 120.

The API may be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of an SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

The identity pass system 110 may include one or more processing circuits/systems including one or more processors (e.g., ASICs, other processor types described herein) and associated memory devices. The one or more processing systems may be configured to perform various functions of the identity pass system 110. In general, at least one (e.g., each) identity pass system 110 may be owned, operated, and/or managed by a provider (e.g., provider institution associated with provider computing system 170) and/or a merchant, such as a credit card issuer, a consultant, a retailer, a service provider, a business, a cash management company, and/or the like. In some arrangements, the identity pass system 110 may include a user interface 114 (shown in FIGS. 3-5). It should be understood that various arrangements may include more, fewer, or different systems than illustrated in FIG. 1, and all such modifications are contemplated within the scope of the present disclosure.

The identity pass system 110 may facilitate operations including creating an identity pass of a user, as well as creating an entity profile for an entity. In some arrangements, the identity pass system 110 may receive a request to create an entity profile (e.g., a group profile) for an entity. The entity profile request may be initiated by a member (e.g., a user) of the entity, an institution, a third party, and the like. The entity profile request may be initiated for various purposes, such as onboarding members, submitting a form, organizing an entity, accessing a resource, and the like. The entity profile may include a plurality of member identity passes (e.g., identity passes corresponding to members of the entity), which may include attributes of the member and identity tokens corresponding with access credentials of the member. For example, each member identity pass may be linked to the corresponding member's data and access credentials.

The identity pass system 110 may receive attributes associated with members of the entity. The attributes may be used to define and authenticate a member's identity, such as personal information (e.g., full name, user name/ID, email address, etc.), demographic information (e.g., date of birth, phone number, etc.), address information, user roles (e.g., admin, guest, etc.) that dictate access levels within the identity pass system 110, permissions (e.g., specific rights associated with the user's role, read/write access, etc.), account preferences, authentication tokens, session information, external identity providers (e.g., social media accounts, federal identity information, etc.), device information, and compliance information. The identity pass system 110 may also receive a verifiable credential of the user, such as educational credentials (e.g., diplomas, degrees, transcripts), professional certifications/licenses, identity credentials (e.g., digital IDs, passports, etc.), employment credentials, health credentials (e.g., vaccination records, medical licenses, etc.), membership credentials (e.g., professional memberships, club memberships, etc.), age verification, digital wallets (e.g., cryptocurrency wallets, etc.), and travel credentials.

In some arrangements, the verifiable credential may include a cryptographic signature created by an issuer (e.g., the entity that issued the credential) of the verifiable credential. The verifiable credential may be signed using a private key to ensure that the credential may be verified by anyone with access to the issuer's public key. The processor may receive metadata about the issuer, including the public key, which may be provided in the form of a digital certificate. The public key of the issuer may be extracted from the verifiable credential, and may be retrieved from a trusted source or included in the verifiable credential. The public key may be used to decrypt a digital signature attached to the credential and confirm the authenticity of the verifiable credential. In some arrangements, a cryptographic operations may be performed to generate a cryptographic object (or cryptographic output) from the verifiable credential to verify the verifiable credential. Cryptographic operations may include encryption/description (e.g., symmetric encryption such as advanced encryption standard (AES), asymmetric encryptions, etc.), hashing (e.g., SHA-256), digital signatures, key change, message authentication codes, cryptographic random number generation, and the like. In some arrangements, the user may provide the cryptographic object for the verifiable credential.

The identity pass system 110 may receive or identify access credentials associated with a member. Access credentials may include any information and/or tools that are used to verify a user's identity and authorize access to specific resources, systems, or information, thereby ensuring that only authorized user may perform certain actions or view sensitive data. For example, the access credentials may include a username and password, multi-factor authentication, security tokens, digital certificates, biometric credentials, access control lists, role based access control, and the like. The access credentials may correspond to an access level that authorizes certain actions/access. In some arrangements, the identity pass system 110 may determine the access level that corresponds to the access credential. In some arrangements, the identity pass system 110 may assess the access level of each member of the entity and adjust the visibility of various resources/actions that be unavailable or restricted. In some arrangements, access levels are implemented via access control lists, role-based access control, and/or attribute-based access control.

The identity pass system 110 may generate an entity profile by generating a member identity pass for at least one member of the entity that includes a set of identity tokens. The identity pass system 110 may generate a set of identity tokens corresponding to an access credential of the member. The identity pass system 110 may define any attributes (e.g., claims) that will be included in an identity token, such as an email address, role/permissions, issued timestamp, and the like. The identity pass system 110 may determine which claims to include based on a member's user information and application requirements. The identity pass system 110 may then select a format for the token (e.g., JSON Web Tokens, etc.) and create token components (e.g., a header, a payload, a signature etc.) The identity token may include a header containing metadata about the token, such as the type of token, the cryptographic algorithm used to sign the token (e.g., HS256, RS256, etc.). The identity token may include a payload containing claims about the user and/or subject of the token. The claims may include registered/standard claims (e.g., unique identifier for the user, timestamp of when the token was issued, timestamp indicating when the token expires, recipient of the token, principal that issued the token, etc.), public claims (e.g., full name, email address, user roles, specific permissions granted, etc.), and private claims (e.g., custom claims created for specific use cases within an application that are not registered or public, etc. The identity token may include a signature generated to ensure the integrity and authenticity of the token. The signature may be created by taking the encoded header and payload, concatenating the encoded header and payload with a period, and signing them using the specified algorithm and a special key. The identity pass system 110 may encode the token components into a single string, generating an identity token. The generated identity token may be stored in a data storage, a memory, local storage cookie, server, cache, and the like. The member identity pass may also include verifiable credentials of a user and/or other attributes of the member. The identity pass system 110 may organize the generated member identity passes into a structured format to generate the entity profile. The entity profile may include information associated with the entity (e.g., name of entity, any relevant metadata, etc.) and a collection of the generated member identity passes.

The identity pass system 110 may facilitate operations including fulfilling a request from the request computing system 150. The identity pass system 110 may receive a request and an access credential and may verify that the access credential corresponds to an access level (e.g., admin, user, read-only, guest, power user, etc.) to perform the request. That is, the identity pass system 110 may verify that a member's access credentials authorize the action or access to fulfill the request. After verifying the access level, the identity pass system 110 may access a data storage (e.g., relational databases, non-relational databases, data warehouses, file storage systems, cloud-based storage systems), such as the identity pass database 120, to fulfill the request. Accessing the data storage may include querying (e.g., receiving specific information from a database or other data repositories using queries), etc. for specific information to satisfy the request. The query may be a request for data or information from the data storage, and may be implemented via various methods and structures. For example, the identity pass system 110 may query for unprotected information of a user that has been determined to be acceptable to transmit, or provide access to.

In some arrangements, the identity pass system 110 may be a network-enabled user-interactive device. In some arrangements, the data acquisition engine 180 may be excluded and/or included within identity pass system 110 itself. In some other arrangements, the identity pass system 110 may not contain a network circuit and may not be network-enabled (e.g., the identity pass system 110 may include short-range, such as NFC, Bluetooth, etc.). Being networked, the identity pass system 110 may communicate over the network with the provider computing system 170 and/or user mobile device (e.g., the user devices 140).

The user interface 114 may be configured to generate and provide one or more graphical user interfaces (GUIs) for presentation on a display screen of an identity pass system 110. That is, the provided GUIs may execute and/or be displayed on a display on the identity pass system 110. In some other arrangements, the GUIs may be provided within a web browser or a mobile application 142. As mentioned above, the GUIs may be provided as one or more interactable user interfaces. In another arrangement, the GUIs are generated and transmitted to the mobile application 142 for accessing by the user.

The GUI presented on the user interface 114 may include a plurality of interactive elements associated with the identity pass system 110, the request computing system 150, and the provider computing system 170. The identity pass system 110 may include instructions (e.g., scripts, executable code, etc.) that when executed by a processing circuit cause one or more GUIs to present on the display interface described herein. As mentioned above, the GUIs may be provided as one or more an interactable web pages. In another arrangement, the GUIs are generated and packaged into a mobile application accessible to a user (e.g., marketplace interface). Additional details relating to the user interface 114 are described in detail with reference to FIGS. 3A-3C, FIG. 4, and FIG. 5.

In some arrangements, the identity pass system 110 may be communicably coupled to an identity pass database 120. The identity pass database 120 may be structured as a repository (e.g., computer storage system such as one or more memory devices, etc.) that stores various data regarding users. The identity pass database 120 may be configured to store identity passes. In some arrangements, identity passes are stored on a distributed ledger that may be a semi-private distributed ledger allowing selective access to the distributed ledger. That is, access to the distributed ledger may be restricted to a defined group of participants (e.g., institutions, organizations, groups, etc.), and allows only authorized participants to access and interact with the ledger. The identity pass database 120 may store user data (e.g., names, addresses, phone numbers, identifier, and so on), authentication information of customers (e.g., username/password combinations, device authentication tokens, security question answers, unique client identifiers, biometric data, geographic data, social media data, and so on), financial information of customers (e.g., token information, account numbers, account balances, available credit, credit history), and the like.

In various arrangements, some of the data may be encrypted by an encryption operation utilizing a cryptographic function. For example, the cryptographic function may be a homomorphic encryption function. In another example, the cryptographic function may be any symmetric encryption function (e.g., Triple Data Encryption Standard (TDES), RC5, Advanced Encryption Standard (AES), Blowfish, CAST, and so on), and/or asymmetric encryption function (e.g. Rivest-Shamir-Adleman (RSA), Efficient and Compact Subgroup Trace Representation (ECSTR or XTR), Digital Secure, Escrowed Encryption Standard (EES), and so on).

The identity pass database 120 may be accessed using one or more memory addresses or index values. The identity pass database 120 may be accessed by the components of the one or more processing circuits described herein (e.g., identity pass system 110, or any other system and/or devices described herein via the data acquisition engine 180) via the network 130. That is, the identity pass database 120 may be in communication with one or more processing circuits of the identity pass system 110, request computing system 150, and/or provider computing systems 170 via a private communication (sometimes referred to herein as a "secure connection"), in that one or more datasets stored in the identity pass database 120. In this regard and as described herein, the provider computing system 170 may maintain the identity pass database 120 in some arrangements.

It should be understood that identity pass database 120 may exist external to the identity pass system 110 and may be accessed via a communication network (e.g., network 130). The identity pass database 120 may be distributed across many different computer systems or storage elements and may be accessed via the communication network or a suitable computer bus interface. The one or more processing circuits of the identity pass system 110 may store, in the identity pass database 120, the results of any or all computations, determinations, encryptions, decryptions, selections, identifications, generations, constructions, or calculations in one or more data structures indexed with appropriate values, at least one (e.g., each) of which may be accessed by the one or more processing circuits of the identity pass system 110 to perform any of the functionalities or functions described herein. In various arrangements, the identity pass database 120 includes various transitory and/or non-transitory storage mediums. The storage mediums may include but are not limited to magnetic storage, optical storage, flash storage, RAM, and so on. The one or more processing circuits may use various APIs to perform database functions (e.g., managing data stored in the identity pass database 120). The APIs may be but are not limited to SQL, NoSQL, NewSQL, ODBC, JDBC, and so on.

Figure 2:
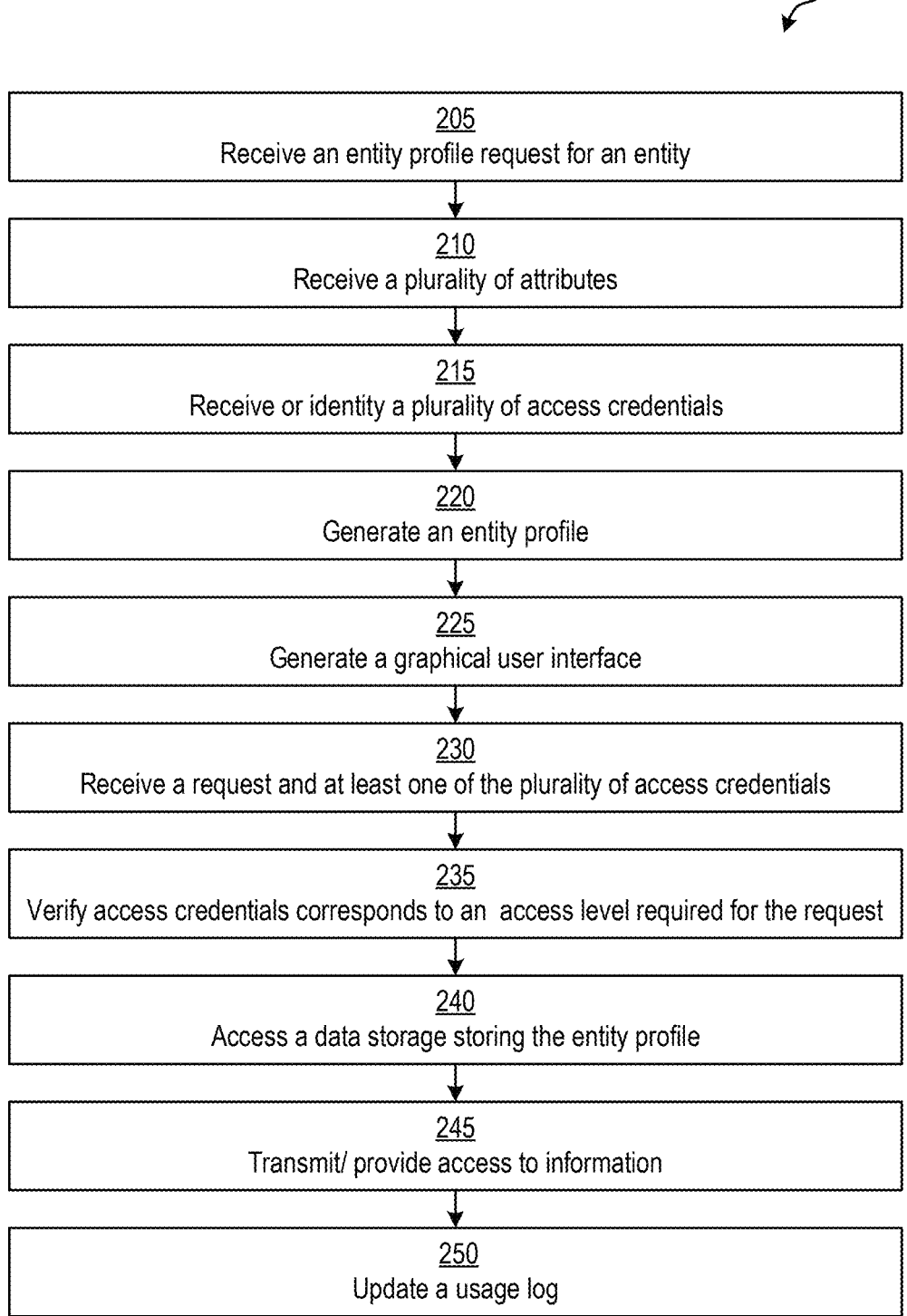
FIG. 2 is a flowchart for a method of generating an entity profile that may be implemented or performed by one or more components of FIG. 1, according to some arrangements.

Referring now to FIG. 2, a flowchart for a method 200 of generating an entity profile that may be implemented or performed by one or more components of FIG. 1 is shown, according to one arrangement. The method 200 may be performed by a processor, such as an at least one processor of the identity pass system 110. Additional, fewer, or different operations may be performed depending on the particular arrangement. In some arrangements, some, or all operations of method 200 may be performed by one or more processors executing on one or more computing devices, systems, or servers. In various arrangements, each operation may be re-ordered, added, removed, or repeated. Additionally, some or all of the operations performed by the blocks may be removed or added.

At block 205, the processor may receive an entity profile request for an entity. That is, the processor may receive a signal (e.g., command, instruction, etc.) to create an entity profile for an entity (e.g., a group, a business, an organization, an institution, a company, etc.). For example, an entity may wish to create an entity profile to manage various identity passes for their employees (e.g., members, associates, etc.). In another example, a company may request an entity profile be created to facilitate use of services and/or resources by various members within the entity. Additionally, the entity profile may be used to manage various levels of access provided to members of an entity and provide convenient access to credentials. For example, the entity profile request may be automatically generated in response to an action, such as a user action, or an account being formed. Additionally, the processor may receive an entity profile request from more than one source, or from a single source, such as a financial institution.

That is, at block 205, the processor may receive an entity profile request. The request may be a signal or command generated to create an entity profile for an organization or group. The processor may interpret the request and initiate the generation process. In some arrangements, the request may be received from multiple sources, such as a financial institution or a user device. For example, an administrator from a company may send a request to manage employee credentials. In another example, a third-party service may trigger the request during an onboarding process. The processor may monitor for these requests in real-time or at periodic intervals, ensuring that the data request is properly formatted and authorized. In this example, the processor may perform validation by checking credentials and verifying the authorization level. If validation is successful, the processor may log the request, recording metadata like a timestamp, requestor identity, and any associated actions for tracking purposes. In yet another example, the request may be generated as part of an automated workflow when creating or modifying an entity account.

In some arrangements, the entity profile request may be initiated by a member of the entity (e.g., an administrator, an executive, information technology, etc.), through user action (e.g., user interactions with an application), or the entity profile request may be initiated by an institution (e.g., a financial institution) or third party. Or, in some arrangements, the entity profile request may be generated responsive to a specific action or process (e.g., incorporation of a business, account opening, employee onboarding, system setup, etc.). Additionally, receiving may include the processor retrieving, fetching, accepting, storing, continuously monitoring, or sporadically monitoring for an identity pass request from one or more sources. Further, receiving the entity profile request may include the processor validating the request (e.g., authenticating, ensuring authorization/ necessary permission to make the request, ensuring the data request is in a valid format, etc.), processing the request, and/or logging the request (ex. recording details such as timestamp, requestor information, action taken, errors, etc.).

At block 210, the processor may receive a plurality of attributes associated with one or more members of the entity. That is, the processor may receive data including identifying information associated with a member (e.g., a user) such as information provided by the member and/or entity, information pulled from databases or other data sources (e.g., the data sources 160), publicly available user information, or private user information. For example, the processor may receive attributes relevant to the entity, such as a position within the entity, contact information (e.g., name, phone number, office location), professional members/associations, and the like. In another example, the attributes may be pulled from forms or records previously provided by the member and/or the entity. Additionally, the processor may receive attributes selected by the entity, or, the processor may receive attributes that satisfy a predetermined criteria.

At block 210, the processor may receive attributes related to the entity members. The processor may collect identifying information for each member, which may include details such as name, role, contact information, and associated permissions. The attributes may be retrieved from internal databases, user-submitted forms, or third-party sources. For example, the processor may pull job title information from a central human resources database. In another example, the processor may receive direct input from users interacting with a graphical user interface. The received attributes may be stored and associated with the corresponding entity profile. In some arrangements, the processor may retrieve these attributes based on predetermined criteria established by the organization or automatically pulled from previous records. Additionally, the processor may retrieve attributes from multiple sources and aggregate them into a single profile. The attributes may then be formatted and structured according to the profile requirements. In another example, the processor may combine data from multiple data sources to ensure accuracy and consistency across the profile.

Figure 3A:
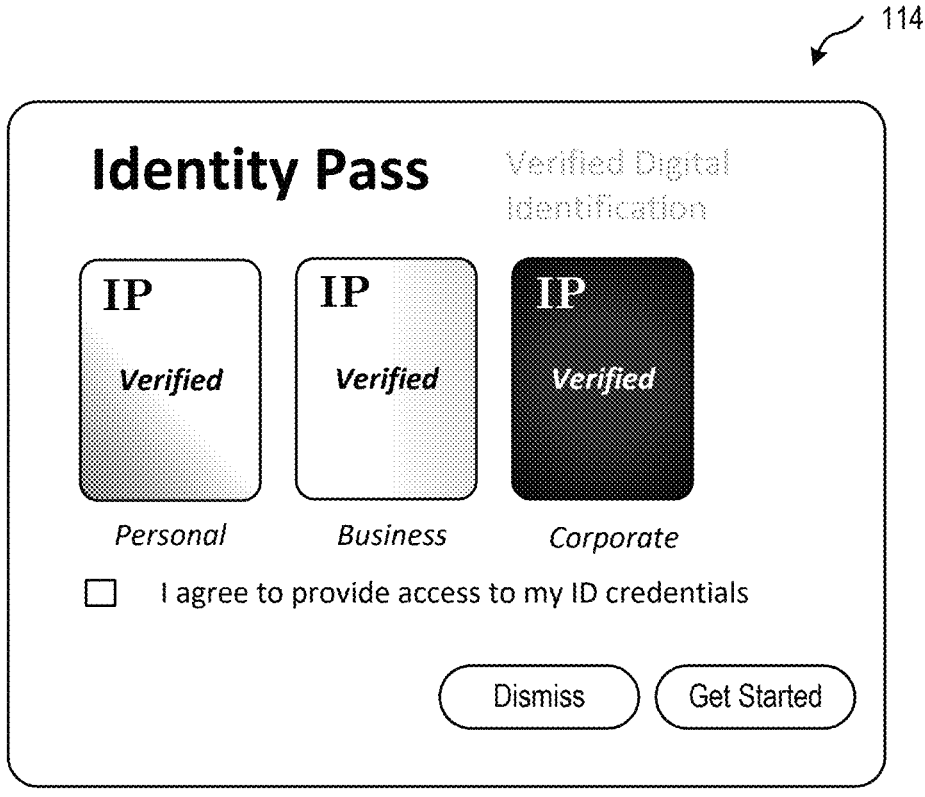
FIGS. 3A-3C are example graphical user interfaces that may be generated by one or more components of FIG. 1, according to some arrangements.

In some arrangements, the attributes may be attributes selected by a user or an institution, or, the attributes may be selected by the processor based at least on criteria. The criteria may vary based at least on application, be user specific, or be defined by the entity and/or an institution providing the entity profile. Additionally, receiving the attributes may include the processor receiving data from input devices (e.g., keyboards, mice, touch screens, etc.). Further, receiving may include the processor retrieving, fetching, or pulling attributes from available data, or, the processor may receive attributes in response to user consent (for example, as shown in FIG. 3A).

At block 215, the processor may receive or identify a plurality of access credentials (e.g., username and password, multi-factor authentication, security tokens, digital certificates, biometric credentials, etc.) of the one or more members of the entity. At least one first access credential of the plurality of access credentials corresponds to a first access level to perform a first set of exchanges or requests. At least one second access credential of the plurality of access credentials corresponds to a second access level to perform a second set of exchanges or request. That is, the processor receives or identifies information (e.g., data, etc.) associated with one or more members of the entity that may be used to authenticate a member and authorize access to a system, application, or resource and/or authorize specific actions. Access credentials may include access tokens representing a member's permissions, roles assigned to the member, or defined access levels associated with the member's role. Access levels may include an admin level providing full access to all resources and settings, a standard user level providing limiting access to perform specific tasks, a read-only level that provides permission to view data without editing capabilities, and a guest level that provides very limited access. For example, the access credentials (e.g., having a first access level) of an executive of a company may allow full access to execute actions, and the access credentials (e.g., having a second access level) of a non-executive employee may allow limited access to execute actions.

That is, at block 215, the processor may process and receive the access credentials for each entity member. The credentials may be used to authenticate and authorize members based on their assigned roles within the entity. Access credentials may include usernames, passwords, multi-factor authentication tokens, and biometric data. The processor may validate each credential by cross-referencing a secure database or accessing predefined access control rules. In some arrangements, the access credentials may be associated with different access levels, allowing the processor to differentiate between administrator, standard, and read-only privileges. For example, an executive may have full administrative rights to modify user settings, while a lower-level employee may only have read access to specific sections of the system. The processor may also store these credentials for future reference and retrieval when handling requests or managing user access within the system.

In some arrangements, the access credentials are provided via user input. For example, a member of the entity may be prompted to enter their username and password in a login interface. In some arrangements, receiving access credentials may include the processor verifying the access credentials, such as by querying a secure database to find a corresponding member record. In some arrangements, the processor may receive information from a member and retrieve the member's access credentials. In some arrangements, the first access level permits access to information associated with the entity and the second access level cannot access the information associated with the entity. For example, the user interface for an employee having access credentials corresponding to a first access level may show information that may be hidden to another employee having access credentials corresponding to a second access level. In some arrangements, the one or members of the entity include a first member associated with a first set of attributes and a first set of access credentials based at least on the first set of attributes, and a second member associated with a second set of attributes and a second set of access credentials based at least on the first set of attributes. The first set of access credentials may be different from the second set of access credentials. In some arrangements, the first access level allows more access to information than the second access level. Additionally, identifying the plurality of access credentials may include the processor comparing the received access credentials to a predetermined set (e.g., a list, a table, etc.) of access credentials.

For example, a CEO of an entity may have access credentials that correspond to the highest level of access (e.g., admin/administrator access). This access level may allow the CEO to manage system settings, user accounts, and permissions. In addition, this access level may provide the CEO full access to all resources, such as creating, updating, or deleting data, managing user roles, and configuring system settings. In another example, a non-executive member (e.g., accounting, marketing, sales, human resources, etc.) may have access credentials that correspond to a standard user access level that allows the non-executive member to perform their job functions but do not provide extensive permissions. The non-executive member may be allowed to create and/or modify their own data, view shared data, and perform specific tasks relevant to their role. In some arrangements, the identity pass system 110 may determine an access level based on specific roles within the entity. That is, each role may have tailored permissions based on job functions.

In some arrangements, the method 200 may include the processor transmitting an authentication request for at least one verifiable credential of the one or more members of the entity. That is, the processor may send a request to verify the identity of a member (e.g., prove attributes about a user) by requesting a credential that may be issued by a trusted authority about the member. For example, the authentication request may be transmitted to the user, a government entity, or third-party. In another example, the processor may transmit the authentication request in response to member initiation/input. In some arrangements, the verifiable credential may include a cryptographic signature created by an issuer (e.g., the entity that issued the credential) of the verifiable credential. The verifiable credential may be signed using a private key to ensure that the credential may be verified by anyone with access to the issuer's public key. The processor may receive metadata about the issuer, including the public key, which may be provided in the form of a digital certificate. The public key of the issuer may be extracted from the verifiable credential, and may be retrieved from a trusted source or included in the verifiable credential. The public key may be used to decrypt a digital signature attached to the credential and confirm the authenticity of the verifiable credential.

In some arrangements, cryptographic operations may be performed to generate a cryptographic object (or cryptographic output) from the verifiable credential to verify the verifiable credential. Cryptographic operations may include encryption/description (e.g., symmetric encryption such as advanced encryption standard (AES), asymmetric encryptions, etc.), hashing (e.g., SHA-256), digital signatures, key change, message authentication codes, cryptographic random number generation, and the like. In some arrangements, the user may provide the cryptographic object for the verifiable credential. In some arrangements, the verifiable credential may be an educational credential, a professional credential, an identity credential, a health credential, a financial credential, an age verification credential, and the like. Additionally, transmitting may include the processor sending the authentication request to a data source that may be associated with the entity that issues, manages, or generates the verifiable credential.

In some arrangements, the method 200 may also include verifying the at least one verifiable credential based at least on verifying a cryptographic object (e.g., a public key, symmetric/asymmetric keys, digital certificates, hash values, digital signatures, tokens, secure enclaves, randomly generated numbers, cryptographic algorithms, etc.), an issuer, or a status associated with the at least one verifiable credential of the one or more members of the entity. That is, the processor may ensure the authenticity, integrity, and validity of the at least one verifiable credential obtained via the authentication request. For example, the processor may retrieve the verifiable credential, validate the structure by checking that the verifiable credential conforms to an expected format (e.g., correct fields and types), check the issuer's signature (e.g., using a public key,), ensure that the verifiable credential is not expired, and/or check that the verifiable credential has not been revoked. In another example, the processor may verify the at least one verifiable credential by assessing the accuracy of the claims within the verifiable credential.

Generally, verifying the cryptographic object may include various verification processes, and generally include hashing, public key operations, and integrity checks. Verifying the verifiable credential may include verifying digital signatures by obtaining the associated data and digital signature, hashing the data by applying the same hash function used by the issuer to generate a hash value, decrypting the signature using the issuer's public key to obtain the original hash value created by the issuer, and comparing the hash values. Verifying the cryptographic object may also include verifying digital certificates, by checking a certificate chain, validating a signature using a public key of the issuer, and checking revocation status (e.g., verifying that the certificate has not been revoked by consulting a certificate revocation list or using an online certificate status protocol, and checking a validity period). Further, verifying the cryptographic object may include verifying tokens and include the processor decoding a received token, verifying the token signature using the issuer's public key, and verifying claims such as expiration time, issuer, and recipient.

In some arrangements, the public key may be retrieved by the processor from a decentralized identifier document or a trusted registry. The processor may use the public key to verify the digital signature attached to the verifiable credential, ensuring that the verifiable credential was issued by the claimed issuer, and the contents of the verifiable credential have not been altered since it was issued. In some arrangements, public keys may be encoded in specific formats for storage and transmission, typically, as strings of characters, including letters, numbers, and special characters. In some arrangements, public keys may be derived from mathematical algorithms and represented as large numbers or points on an elliptic curve. Additionally, public keys may have different lengths and complexity to ensure security.

For example, using an RSA encryption, the verifiable credential may be encrypted and/or hashed by the issuer of the verifiable credential such that the verifiable credential may be considered signed. The processor may calculate a hash of the verifiable credential, and decrypt the verifiable credential using the public key to produce a hash. If the two hashes are identical the processor may verify the verifiable credential was signed by the central provider and that it was not changed or tampered with. Alternatively, if the two hashes do not match, the verifiable credential may not be the verifiable credential sent by the issuer (e.g., it was changed or tampered with). In various arrangements, instead of using RSA encryption, the digital assets may be signed and verified using AES encryption, SHA encryption, DES encryption, and so on. All communications may be encrypted with one or more secure network protocols (e.g., Secure Shell (SSL), Kerberos, IPSec, Secure Sockets Layer (SSL), Hypertext Transfer Protocol Secure (HTTPS), etc.) implemented utilizing a cryptographic function (e.g., symmetric encryption, asymmetric encryption, hashing, etc.). In some examples, the cryptographic function may be a homomorphic encryption function. In some examples, the cryptographic function may be any symmetric encryption function (e.g., Triple Data Encryption Standard (TDES), RC5, AES, Blowfish, CAST, etc.), and/or asymmetric encryption function (e.g., RSA, Efficient and Compact Subgroup Trace Representation (ECSTR or XTR), Digital Secure, Escrowed Encryption Standard (EES), etc.).

At block 220, the processor may generate an entity profile including a plurality of member identity passes. At least one first member identity pass of the plurality of member identity passes corresponds to a first member of the one or more members of the entity. At least one second member identity pass of the plurality of member identity passes corresponds to a second member of the one or more members of the entity. The at least one first member identity pass of the plurality of member identity passes includes a first set of identity tokens corresponding with the at least one first access credential of the first member. The at least one second member identity pass of the plurality of member identity passes includes a second set of identity tokens corresponding with the at least one first access credential of the second member. The at least one first member identity pass and the at least one second member identity pass include the plurality of attributes of the one or more members of the entity. That is, the processor may generate an entity profile including member identity passes for various members within the entity. At least one (e.g., each) member identity pass includes identity tokens that correspond with an access credential of the associated member, and the member identity passes may reflect the attributes that were previously received. The identity token may be a digital representation of a member's identity, and may contain attributes such as name, roles, permissions, and the like.

That is, at block 220, the processor may generate an entity profile, which may include member identity passes for various members within the entity. Each member identity pass may consist of a set of identity tokens that correspond to the attributes and access credentials of the member. For example, an executive's identity pass may include tokens indicating full administrative privileges, while a standard employee's pass may reflect limited access. The processor may also associate each identity token with specific roles or permissions to regulate the level of access for each user. In another example, the processor may create identity passes that are specialized for particular departments within the entity, such as finance or human resources. The entity profile may be structured to consolidate all these member identity passes into a cohesive structure, ensuring that access control and permissions are applied appropriately. The entity profile may be updated periodically to reflect changes in membership or role adjustments within the organization.

For example, an entity profile for a company may include a member identity pass for each employee of an executive board within the entity (e.g., CEO, CTO, CFO, etc.). A member identity pass for each member includes a set of identity tokens that corresponds with that particular member's access credentials. In another example, the entity profile for a partnership may include a member identity pass for a first partner and a member identity pass for a second partner. At least one (e.g., each) partner's member identity pass includes identity tokens that are associated with attributes associated with at least one (e.g., each) partner.

In some arrangements, the processor may define entity attributes (e.g., name, type, organization, contact information, members, sub-entities, roles, access levels) and may gathers information from various sources (e.g., internal databases, user input forms, existing documentation/records, etc.). The processor may generate member identity passes for a portion of the entity, or, for each member of the entity. The member identity passes may include identity tokens including specific attributes linked to each member (e.g., name, role, access credentials). The processor may organize the collected information and membership identity passes into an entity profile. In some arrangements, the entity profile includes a detailed list of all members, organizational structure, entity overview information, and an overview of access rights for the entity as a whole and for individual members. The entity profile may include a visual representation, a downloadable format, a sharable link, and the like.

In some arrangements, the entity profile may be updated as changes occur (e.g., adding or removing members, changing access levels, new roles, etc.).

In some arrangements, generating the entity profile includes the processor generating member identity passes. For example, the processor may first generate individual member identity passes before generating a cumulative entity profile. In some arrangements, a member of the entity may have a corporate identity pass corresponding to an entity profile in addition to a personal identity pass for use outside of the entity. In another example, the processor may generate member identity passes and the entity profile concurrently. In some arrangements, the entity profile may include one or more member identity passes for members that have a shared characteristic (e.g., belong to the same entity, belong to the same sub-group in the entity, belong to one department in the entity, etc.). Additionally, generating the entity profile may include the processor generating a token (e.g., tokenizing) based at least on the received attributes. In some arrangements, the access credentials of a member may be dependent on the set of identity tokens (e.g., the first set of identity tokens, the second set of identity tokens). For example, a member identity pass may include a set of identity tokens associated with an executive position within an entity, and the corresponding access credential of the member may be provided because of the member's role in the entity.

At block 225, the processor may generate a GUI including a representation of the entity profile, the entity profile including one or more interactive elements. Selection of the one or more interactive elements includes updating the representation corresponding with the entity profile based at least on a corresponding access credential of the plurality of access credentials of the one or more members. That is, the processor may create a representation that encompasses the way the entity profile and/or the member identity passes of the entity profile are visually and/or functionally depicted and/or structured for users via a user interface. Generating a representation may include rendering a visual representation of the entity profile. For example, the visual representation of the entity profile may include a display area where a depiction of the entity profile is rendered, text elements, and/or image elements. The processor may design and/or render, for example, a dashboard, an activity log, menu, a window, a screen, a landing page, and the like. The processor may apply styles (e.g., colors, fonts, spacing, borders, background patterns, images), branding elements (e.g., logos, design themes, etc.), security features, and the like.

That is, at block 225, the processor may generate a graphical user interface (GUI) that represents the entity profile. This GUI may include various interactive elements that allow users to view and manage their member identity passes. The processor may design the GUI to reflect different access levels, displaying more sensitive information to members with higher privileges while restricting access for others. For example, an administrator may be able to see all member details and access logs, while a standard employee may only see their own credentials. The processor may enable interaction through various GUI elements, such as buttons, dropdown menus, and text fields, allowing users to update their information or request new actions. Additionally, the GUI may be updated dynamically as the processor receives new data or processes user interactions. In some arrangements, the GUI may trigger actions, such as logging user activity or adjusting permissions, based on the user's interaction with specific elements of the interface. The processor may continuously update the GUI to reflect real-time changes in the entity profile and access levels.

The processor may generate user input elements such as buttons, icons, menus, text fields, checkboxes, and the like, for a user to interact with. A user may select the interactive element by clicking a text box, typing data into a text input field, clicking a dropdown menu, clicking a radio button, clicking a checkbox, dragging a slider, clicking a button to trigger an action, selecting a file to upload, clicking a toggle switch, and the like. For example, a member may navigate to a page in an entity profile management application and click through a menu to navigate to a page requesting a new transaction. The member's selection may trigger an update to a usage log for the entity by creating a new entry in the usage log. In some arrangements, the usage log may depict a record of activity relating to the entity profile and include entries for each transaction with a timestamp, description, and an identification of the member initiating the transaction. For example, a member may make a selection to enact a transaction using their member identity pass, and the transaction may be reflected in a usage log of the entity profile that may be displayed on a user interface. The usage log may include specific details relating to the transaction, such as the member that made the selection, transaction details, and a timestamp of the transaction. Additionally, the GUI generated may display certain elements/features, such as those providing more confidential information, of the representation based at least on access credentials (e.g., certain elements/features are hidden for some access credentials).

In some arrangements, updates to the representation are triggered in response to a member making a selection. Additionally, updating the representation may include the processor retrieving and processing updated data. Further, updating the representation may include the processor identifying various GUI elements that need to be updated based at least on data changes, such as text fields, graphs/charts, or lists/table, and the like. In some arrangements, updating the representation includes providing a notification/alert or other visual indicator to indicate that an update has occurred. Examples of GUIs are discussed in detail below with reference to FIGS. 3A-3C, FIG. 4, and FIG. 5.

At block 230, the processor may receive a request and at least one of the plurality of access credentials corresponding with at least one first identity token of the first set of identity tokens or at least one second identity token of the second set of identity tokens. The request maybe for an exchange using an exchange instrument, by the one or more members of the entity, or providing at least one of the plurality of attributes of the one or more members of the entity. That is, the processor may receive a request for information as well as access credentials of a member in order to complete a transaction or provide access to, or transmit specific attribute information associated with a user. For example, the processor may receive a request for information associated with attributes of a member to populate a form in addition to credentials indicating authorization or permission to access this information.

That is, at block 230, the processor may receive a request that includes at least one of the access credentials from the plurality of credentials associated with the identity tokens. The request may be for accessing information or initiating a transaction tied to a member's role within the entity. For example, a member may submit a request to access financial data or complete a form for an internal process. The processor may verify that the request aligns with the access level granted to the member's identity token. In some arrangements, the processor may compare the access credential received with predefined conditions to ensure the member has the necessary permissions to proceed with the requested action. Additionally, the processor may retrieve additional tokens or attributes associated with the member if needed to satisfy the request. In some examples, the processor may trigger additional validation steps if the access credentials indicate higher-level permissions, such as for administrative actions.

In some arrangements, the request may be triggered in response to a specific action or process relating to the exchange/exchange instrument. For example, the request may be initiated by a user or an application (e.g., via a user interface) to execute a trade, transfer, or information exchange. Additionally, receiving the request may include the processor listening for incoming requests through a network connection or receiving a message identifying the exchange instrument, an amount or value involved in the exchange, as well as access credentials for authentication.

At block 235, the processor may verify the at least one of the plurality of access credentials corresponds to an access level to perform the request. That is, the processor may validate the request by comparing a user's permissions against an access level for the request, and confirming that a member has permission to perform the requested action. For example, initiating a request to invest entity funds may require an access level that corresponds to access credentials associated with executive member of the entity. If a requestor's access credentials do not correspond to the access level, the request may be denied. If the access credentials do correspond to the access level, the request may proceed. In another example, the processor may receive a request to complete a loan application for the entity. To perform this request, at least one (e.g., each) member of the entity must complete the loan application individually using their member identity pass. The processor may verify that at least one (e.g., each) member has the access credentials to complete the loan individually. In some arrangements, the processor may identify roles assigned to a member that dictate their permissions (e.g., role-based access control), or, the processor may determine permissions based at least on user attributes and other conditions/parameters (e.g., attribute-based access control). Additionally, verifying may include the processor comparing access credentials against a securely stored data base, communicating with an identity provider to validate a token, or retrieving a member's roles and associated permissions from a database or access control list (e.g., role-based access control, attribute-based access control). Further, verifying may include the processor analyzing the request to determine what access level may be needed to perform the request. For example, the processor may identify permissions for a specific action based at least on a predetermined access level definition. In some arrangements, the processor may identify a member's access level based on a defined hierarchy or organizational structure of the entity, or based on a department or team that the member is associated with.

That is, at block 235, the processor may verify the access credentials by comparing them against the required access level for the specific request. Block 235 may include the processors authenticating the credentials through cross-referencing with a secure data store or identity provider. For example, if a request to execute a transaction is received, the processor may first check whether the member's credentials meet the necessary security level for performing such a transaction. In another example, the processor may validate the credentials to ensure that only authorized personnel may access sensitive data, such as financial or personal records of the entity. If the credentials match the access requirements, the processor may proceed with granting the requested action. In cases where the access credentials are insufficient, the request may be denied, and the processor may generate an alert or log the failed attempt.

At block 240, responsive to verifying that the least one of the plurality of access credentials corresponds to the access level to perform the request, the processor may access a data storage storing the entity profile. Accessing the data storage includes querying for information of the entity corresponding with the at least one first identity token of the first set of identity tokens or the at least one second identity token of the second set of identity tokens. The query returns the information to satisfy the exchange or permit access to at least one of the plurality of attributes. That is, once authorized access may be verified, the processor may communicate with a data storage storing the entity profile and identify and/or retrieve relevant information relating to the identity tokens contained in the member identity passes based at least on parameters to satisfy the request. The processor may utilize queries (e.g., requests for information/data) to access, manipulate, or analyze data based on specific criteria. The processor may utilize queries (e.g., database queries, search queries, API queries, etc.) to return desired results. The processor may receive or formulate a query to retrieve the requested data, send the query to the data storage, execute the query by accessing (e.g., reading data, applying filters, joins, aggregations, or calculations, etc.) the necessary data, and retrieve the data. In some arrangements, the processor may formulate a query based on user input or application logic. For example, the processor may access a data storage and seek information relating to filling out a loan application. The processor will not return information that is not relevant to the request, and therefore will not share protected information when not needed. In some arrangements, a processor of the data storage may receive the query, execute the query, and return results to the processor.

That is, at block 240, once the access credentials are verified, the processor may access a data storage system to retrieve relevant information associated with the identity tokens. The processor may generate a query to extract data based on the access level and attributes tied to the identity token. For example, if a member requests access to operational data, the processor may query the storage system for data specific to that member's role and permissions. The query may be designed to filter out unnecessary or restricted information, ensuring that only authorized data is retrieved. The processor may then return the appropriate information to the member or use the data to populate forms or complete transactions. In some arrangements, the data storage system may include a distributed ledger or other secure storage mechanisms to protect sensitive entity information during the retrieval process.

In some arrangements, the data storage may be a distributed ledger. The distributed ledger may be a semi-private distributed ledger allowing selective access to the distributed ledger. That is, access to the distributed ledger may be restricted to a defined group of participants (e.g., institutions, organizations, groups, etc.), and allows only authorized participants to access and interact with the ledger. Additionally, accessing the data storage may include the processor generating a request for data, using a data bus to communicate with the data storage, retrieving data, transferring data, and processing the retrieved data. In some arrangements, the data storage may be a cloud storage, network attached storage, database storage, hybrid storage, and the like. In some arrangements, the data storage may be a distributed ledger database/blockchain.

At block 245, the processor may transmit, to a computing system, the information to satisfy the exchange or permit access to at least one of the plurality of attributes by the computing system. That is, the processor may complete (e.g., satisfy, fill, execute, etc.) the data request by fetching/ retrieving and/or identifying the data from the data storage and to be sent to the requestor. For example, the processor may transmit information to populate corresponding data fields for an application. In another example, the processor may provide permission to the computing system to access the information. In some arrangements, the processor may send the information directly (e.g., direct data transmission), or in a requested structured format. In some arrangements, the processor may grant access to certain data using various access control protocols, such as token-based access. Additionally, transmitting the unprotected data may include the processor encrypting or securing data (e.g., hashed, password protected, etc.) that may be shared and/or accessed to prevent unauthorized parties from performing unauthorized actions. For example, a masking algorithm may be executed performing bitwise operations (e.g., NOT, AND, NAND, OR, XOR, Complement, left-shift (logical or arithmetic), right-shift (logical or arithmetic), rotate right, rotate left, and so on) on any data that may be transferred. In some arrangements, the processor may grant access that may be time dependent to minimize exposure to sensitive information, or ensure that data access mechanisms. Further, access to the information may include the processor allowing a user to control and manage the access (e.g., monitoring access, revoking access, pausing access, etc.).

That is, at block 245, the processor may transmit the retrieved data or grant access based on the verified credentials. The transmission may occur between the processor and a computing system that requires the data to complete a task or request. In some arrangements, the processor may structure the data into a specific format before transmitting it. For example, the processor may format the data to populate an application form or to provide structured information for a financial transaction. In another arrangement, the processor may grant direct access to the data storage for specific time-limited access, ensuring that the computing system may only retrieve what is necessary for the task. Additional security measures, such as encryption or access control protocols, may be applied to secure the data transmission and prevent unauthorized access.

At block 250, the processor may update a usage log of the entity profile corresponding with the request. That is, the processor may update (e.g., add an entry to) a detailed record capturing various interactions and activities relating to the entity, including requests. For example, when a request may be processed, the processor may generate a new entry in the usage log with specific details (e.g., timestamp of data request, time of access, what user information was shared, identity of requestor, resources accessed, outcome, geolocation data etc.) of the request. The entry may be structured in a consistent, structured format. Additionally, updates to the usage log may be triggered by specific actions, such as user actions, system events, or data request being received.

That is, at block 250, the processor may update a usage log corresponding to the entity profile based on the request and action taken. The usage log may capture details such as the request type, the credentials used, the data accessed, and the timestamp of the action. The processor may structure this log in a standardized format for auditing and monitoring purposes. For example, if a member accesses sensitive financial information, the usage log may include details about the member's role, the specific data accessed, and the permissions granted during the session. The log may also include entries for any denied requests, recording details such as the reason for denial and the credentials used. In some arrangements, the usage log may be accessible via a user interface, allowing administrators or other authorized personnel to review the activity related to the entity profile.

In some arrangements, updating the usage log of the identity pass includes updating the representation of the entity profile in the GUI. In some arrangements, the usage log may be accessed directly from a menu of a member's user device (e.g., in a mobile application). The usage log of an entity may be displayed when a member selects the entity profile in a menu. In some arrangements, further details of each transaction may be accessed by selecting the corresponding entry in the usage log. Additionally, updating may include generating a GUI that presents features that are visible only to a subset of members within the entity.

Optionally, in some arrangements, the method 200 includes the processor receiving a request for supplementary information associated with one or more members of the entity. The processor receives the supplementary information, generates a new identity token including the supplementary information, and updates the entity profile based at least on the new identity token. That is, the processor may receive a request for additional information relating to members of the entity, and subsequently tokenize the additional information and update the entity profile. Additionally, the processor may receive a request for supplementary information when updated information becomes available for a user, such as a user's credit score changing.

In some arrangements, the supplementary information may be a tax history or credit score associated with a members. The supplementary information may be user information that may be not currently contained in the identity pass. For example, the supplementary information may be information that may be not available based at least on any prior user-provided information, or, it may be private information (e.g., information that may be not desirable to be public, sensitive information, information that may pose a security risk, etc.). The supplementary information may be, for example, tax history, or a credit score. In some arrangements, user approval may be user consent provided via a user interface (e.g., user interface 114). In some arrangements, the processor verifies the data request using at least one authentication protocol, and transmits the at least one first identity token of the first set of identity tokens or the at least one second identity token of the second set of identity tokens to a computing system (e.g., request computing system 150).

Referring now to FIGS. 3A-3C and 4-5, example illustrations of the user interface 114 are depicted, according to some arrangements. The user interface 114 may be provided on a user device 140 and may include a plurality of interactive elements. Interactive elements (e.g., input fields, scroll elements, selectable icons, etc.) may include, but are not limited to, text input, buttons, icons, images, switch, drop-downs, speech-to-text, and so on. Furthermore, various interactive elements are contemplated in this disclosure. For example, a user may select an operation to perform.

Figures 3B, 3C:
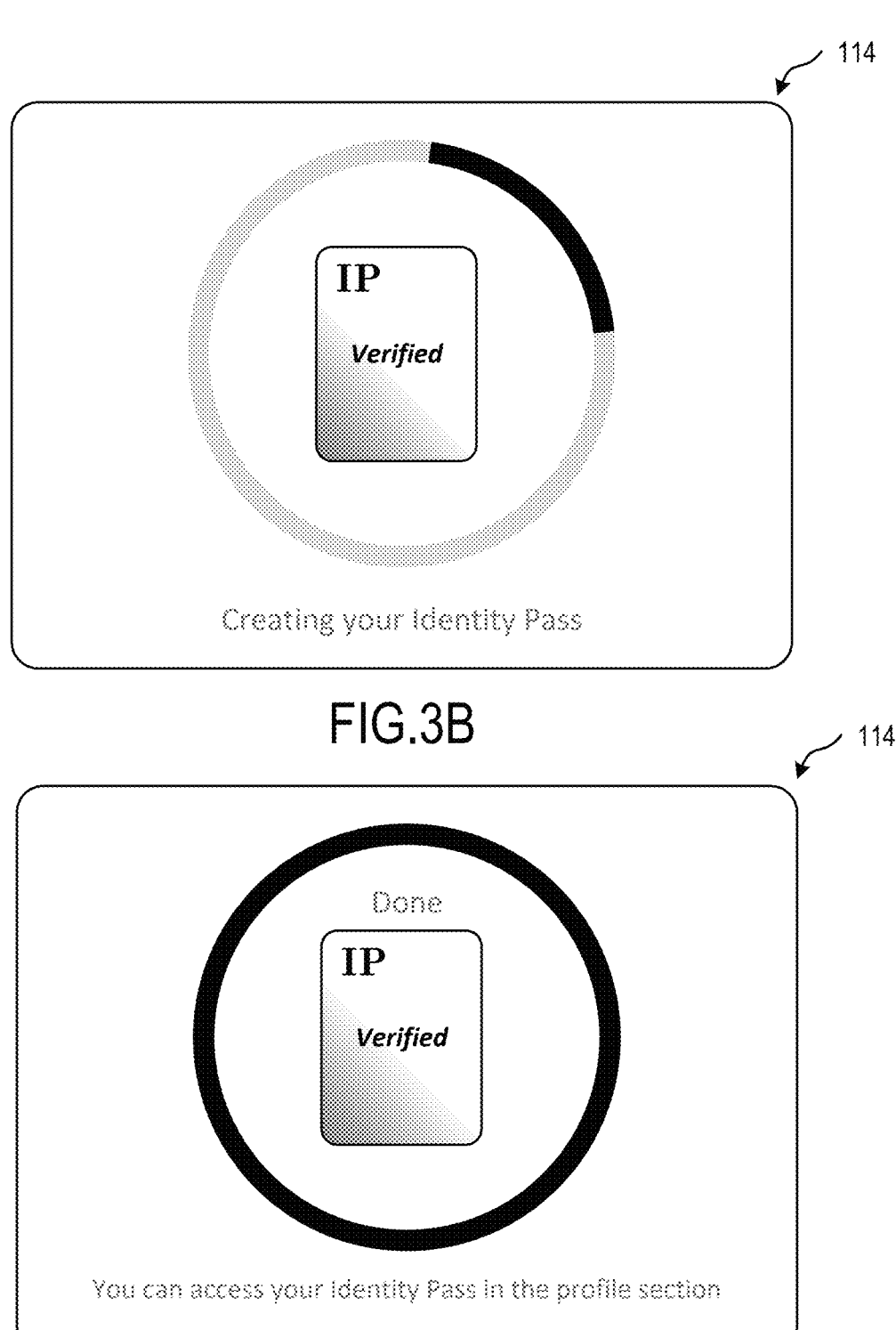

Referring to FIGS. 3A-3C in more detail, FIG. 3A illustrates a starting page (e.g., menu, screen, etc.) for a member to initiate the creation of an member identity pass. A member may have an identity pass for personal use, as well as a corporate/business member identity pass. FIG. 3A shows a request for consent to access a member's ID credentials.

FIGS. 3B-3C depict a loading screen as a member identity pass for a member may be created. The user interface 114 may display a visual representation of the identity pass resembling a card or pass.

Referring to FIG. 3A, the user interface 114 may display an identity pass option, wherein a user may select from different identity pass profiles, such as Personal, Business, or Corporate profiles. The user interface 114 may include visual representations of these passes, each with an associated "Verified" status. For example, the user may select the "Personal" profile to provide access to personal credentials for verification. In another example, the user may opt for the "Corporate" profile to share credentials relevant to business interactions. In yet another example, the "Business" profile may be selected for professional purposes. The user interface 114 may include an agreement checkbox, such as "I agree to provide access to my ID credentials," which may be selected by the user before proceeding. After selecting the appropriate identity pass, the user may be presented with a "Continue" button to advance to the next step. In another example, the user may select "Get Started" to initiate the identity pass creation process. In some arrangements, the identity pass selection may dictate the specific data shared with the respective institution or service provider.

Referring to FIG. 3B, the user interface 114 may display a progress indicator while creating the identity pass. The user interface 114 may depict a circular progress bar, with a portion of the circle filled to represent progress toward completing the pass creation. For example, the progress bar may visually display the current step of generating the identity pass by indicating the percentage completed. In this example, the progress indicator may show the "Creating your Identity Pass" text beneath the progress circle, informing the user of the ongoing process. In another example, the identity pass creation process may include pulling user credentials from various data sources. The user interface 114 may update dynamically as the system verifies and compiles credentials into the identity pass. In yet another example, the system may display an error or retry mechanism within the user interface 114 if there is an issue during pass creation. The visual feedback provided by the progress indicator may help the user understand the time remaining for the identity pass creation.

Referring to FIG. 3C, the user interface 114 may display a confirmation screen once the identity pass creation is complete. The user interface 114 may include a text indicator, such as "Done," confirming the successful completion of the pass generation process. For example, the user interface 114 may visually confirm that the identity pass has been successfully created and verified, as indicated by the "Verified" badge displayed within the circular element. In this example, the system may prompt the user to access the newly created identity pass in the profile section, guiding them to the appropriate location within the application. In another example, the user interface 114 may provide additional buttons or options for the user to navigate to other sections of the application where the identity pass may be used. Additionally, in some arrangements, the completion screen may provide details or next steps for using the identity pass within the system. For instance, the user may be notified that the identity pass is ready to be shared with trusted institutions.

Figure 4:
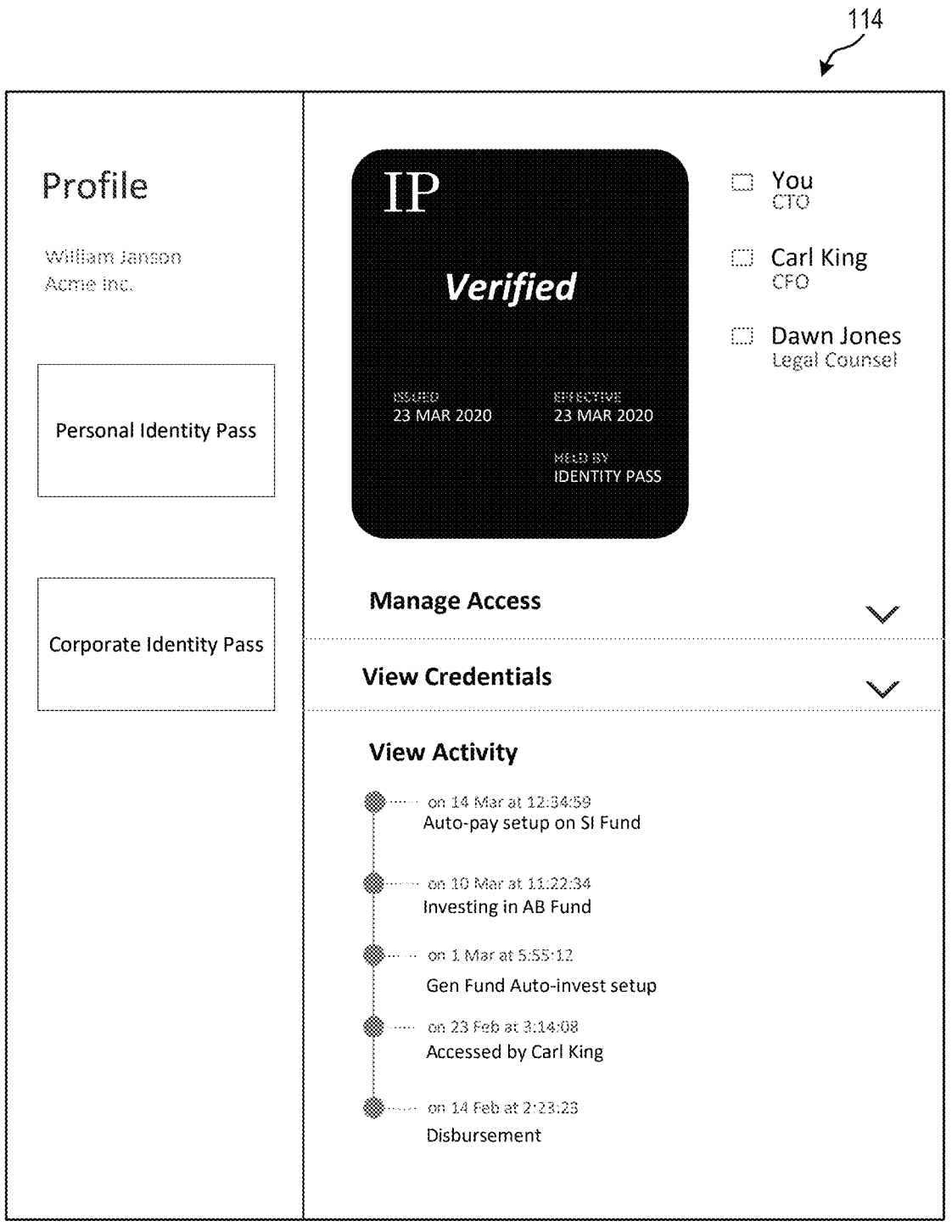
FIG. 4 is an example graphical user interfaces that may be generated by one or more components of FIG. 1, according to some arrangements.

Referring to FIG. 4, dashboard (e.g., landing page, profile page, main page, etc.) may be displayed on a user device, and may be used to manage multiple identity passes. The dashboard in FIG. 4 includes a visual representation of a corporate identity pass, including an issue date, effective date, and the like. In addition, the dashboard includes information about various members of the entity and at least one (e.g., each) member's role within the entity. For example, the processor may the names and roles (e.g., titles, positions, etc.) of other members of the entity. In addition, the dashboard provides means to manage access to the corporate identity pass, credential information, as well as an activity log (e.g., a usage log). The usage log contains a time stamp and description of activity within the entity, including transactions and access. In addition, the usage log identifies actions taken by members of the entity.

Referring to FIG. 4, the user interface 114 may display a profile management screen for the identity pass, allowing the user to manage different aspects of their digital identity. The user interface 114 may include a section titled "Profile," displaying user information such as the name of the user and account status. For example, the user interface 114 may present a "Personal Identity Pass" and a "Corporate Identity Pass" option, enabling the user to switch between different profiles. In this example, the identity pass may display its "Verified" status, along with issue and expiration dates. The user interface 114 may also include checkboxes, such as "Travel" and "Credit," indicating the types of credentials available for use. In another example, the user may manage access to the identity pass by selecting the "Manage Access" dropdown. In yet another example, the user interface 114 may provide the option to view credentials in detail by expanding the "View Credentials" section. The activity log displayed under "View Activity" may show recent interactions with the identity pass, such as credential sharing events or authentication actions. Each entry in the activity log may include a timestamp and details of the action performed, providing a view of the identity pass's usage.

Figure 5:
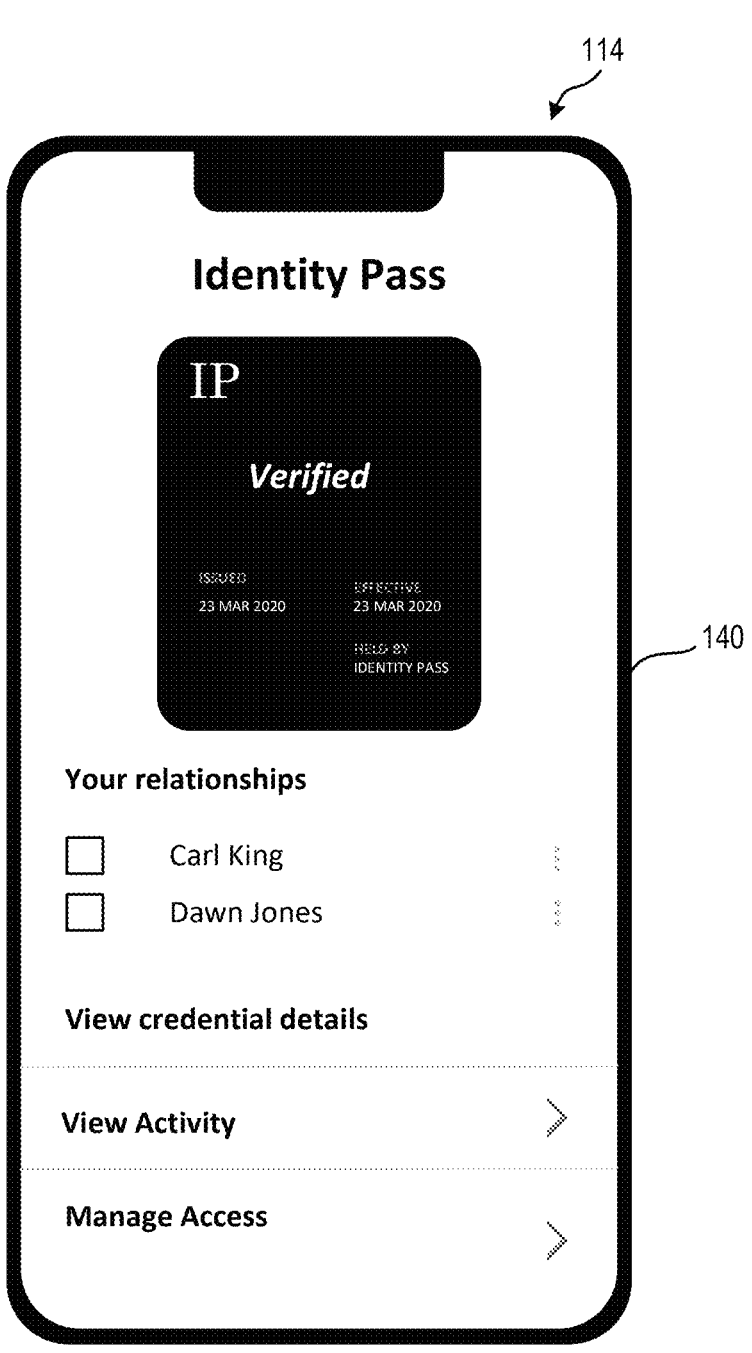
FIG. 5 is an example graphical user interface that may be generated by one or more components of FIG. 1, according to some arrangements.

FIG. 5 shows a dashboard similar to that shown in FIG. 4. The dashboard shown in FIG. 5 may be displayed on a user device 140. A member may launch an application on the user device and select the corporate identity pass to view additional information relating to the entity. Similar to FIG. 4, the dashboard includes any relationships with other members within the entity, and also includes credential details. Access to the corporate identity pass may also be managed (e.g., revoked, paused, approved, etc.).

Referring to FIG. 5, the user interface 114 may be presented on a mobile device, providing an identity pass management screen. The user interface 114 may display the verified status of the identity pass, alongside critical details such as issue and expiration dates. For example, the user may view relationships associated with the identity pass, such as "Credit King" or "Dawn Jones Legal Counsel," by selecting the appropriate checkboxes. In this example, the user interface 114 may allow the user to view credential details by expanding the "View Credential Details" section. In another example, the "View Activity" section of the user interface 114 may be accessible via a dropdown, showing recent actions performed with the identity pass, such as credential sharing or authentication. The "Manage Access" option may allow the user to adjust access permissions for the identity pass, enabling or disabling access for various applications or institutions. The user interface 114 may be structured to fit mobile devices, ensuring an intuitive layout for managing identity pass credentials while on the go. Additionally, the interface may dynamically update based on user actions, such as when the user shares their credentials or updates their access settings.

Figure 6:
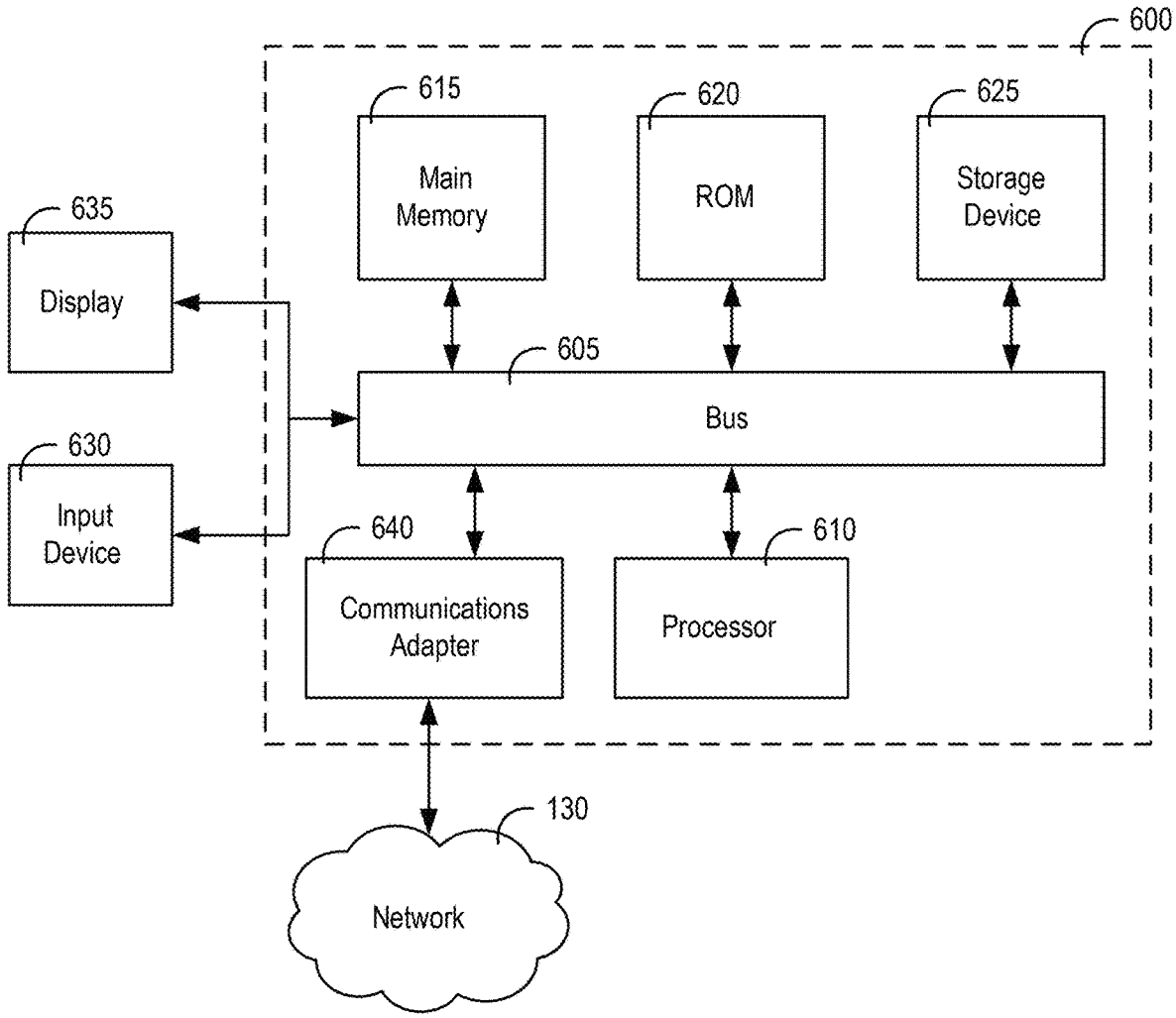
FIG. 6 is a block diagram illustrating an example computing system suitable for use with various components of FIG. 1 according to the various arrangements described herein.

Referring now to FIG. 6, a depiction of a computing system 600 is shown. The computing system 600 may be used/be representative of a computing system for at least one the identity pass system 110, user devices 140, request computing system 150, data sources 160, and/or provider computing system 170. The computing system 600 includes a bus 605 or other communication component for communicating information and a processor 610 coupled to the bus 605 for processing information. The computing system 600 also includes main memory 615, such as a random-access memory (RAM) or other dynamic storage device, coupled to the bus 605 for storing information, and instructions to be executed by the processor 610. Main memory 615 may also be used for storing position information, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid-state device, magnetic disk, or optical disk, may be coupled to the bus 605 for persistently storing information and instructions.

The computing system 600 may be coupled via the bus 605 to a display 635, such as a liquid crystal display, or active-matrix display, for displaying information to a user. An input device 630, such as a keyboard including alphanumeric and other keys, may be coupled to the bus 605 for communicating information, and command selections to the processor 610. In another arrangement, the input device 630 has a touch screen display 635. The input device 630 may include any type of biometric sensor, a cursor control, such as a mouse, a trackball, or cursor direction keys, for communicating direction information and command selections to the processor 610 and for controlling cursor movement on the display 635.

In some arrangements, the computing system 600 may include a communications adapter 640, such as a networking adapter. Communications adapter 640 may be coupled to bus 605 and may be configured to facilitate communications with a computing or communications network 130 and/or other computing systems. In various illustrative arrangements, any type of networking configuration may be achieved using communications adapter 640, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein may be achieved by the computing system 600 in response to the processor 610 executing an arrangement of instructions contained in main memory 615. Such instructions may be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 6, arrangements of the subject matter and the functional operations described in this specification may be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification may be implemented as one or more computer programs, e.g., one or more subsystems of computer program instructions, encoded on one or more computer storage medium for execution by, or to control the operation of, data processing apparatus. Alternatively, or in addition, the program instructions may be encoded on an artificially generated propagated signal, e.g., a machine generated electrical, optical, or electromagnetic signal, that may be generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium may not be a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium may be both tangible and non-transitory.

Although shown in the arrangements of FIG. 6 as singular, stand-alone devices, one of ordinary skill in the art will appreciate that, in some arrangements, the computing system 600 may include virtualized systems and/or system resources. For example, in some arrangements, the computing system 600 may be a virtual switch, virtual router, virtual host, virtual server. In various arrangements, computing system 600 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

While this specification contains many specific arrangement details and/or arrangement details, these should not be construed as limitations on the scope of any disclosure or of what may be claimed, but rather as descriptions of features specific to particular arrangements and/or arrangements of the systems and methods described herein. Certain features that are described in this specification in the context of separate arrangements and/or arrangements may also be implemented and/or arranged in combination in a single arrangement and/or arrangement. Conversely, various features that are described in the context of a single arrangement and/or arrangement may also be implemented and arranged in multiple arrangements and/or arrangements separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims may be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the arrangements and/or arrangements described above should not be understood as requiring such separation in all arrangements and/or arrangements, and it should be understood that the described program components and systems may generally be integrated together in a single software product or packaged into multiple software products.

Having now described some illustrative arrangements, implementations, and embodiments it may be apparent that the foregoing may be illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one arrangement and/or arrangement are not intended to be excluded from a similar role in other arrangements or arrangements.

The phraseology and terminology used herein may be for the purpose of description and should not be regarded as limiting. The use of "including" "comprising" "having" "containing" "involving" "characterized by" "characterized in that" and variations thereof herein, may be meant to encompass the items listed thereafter, equivalents thereof, and additional items, as well as alternate arrangements and/or arrangements consisting of the items listed thereafter exclusively. In one arrangement, the systems and methods described herein consist of one, each combination of more than one, or all of the described elements, acts, or components.

Any references to arrangements, implementations, or elements or acts of the systems and methods herein referred to in the singular may also embrace arrangements and/or arrangements including a plurality of these elements, and any references in plural to any arrangement, arrangement, or element or act herein may also embrace arrangements and/or arrangements including only a single element. References in the singular or plural form are not intended to limit the presently disclosed systems or methods, their components, acts, or elements to single or plural configurations. References to any act or element being based at least on any information, act or element may include arrangements and/or or arrangements where the act or element may be based at least in part on any information, act, or element.

Any arrangement disclosed herein may be combined with any other arrangement, and references to "an arrangement," "some arrangements," "an alternate arrangement," "various arrangement," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing arrangements and/or arrangements are illustrative rather than limiting of the described systems and methods. Scope of the systems and methods described herein may be thus indicated by the appended claims, rather than the foregoing description, and changes that come within the meaning and range of equivalency of the claims are embraced therein.

It should be understood that no claim element herein may be construed under the provisions of 35 U.S.C. § 112(f) unless the element may be expressly recited using the phrase "means for." As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some arrangements, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively, or additionally, the one or more processors may be structured to perform or otherwise execute certain operations independent of one or more co-processors. In other example arrangements, two or more processors may be coupled via a bus to facilitate independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some arrangements, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the arrangements might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), math-based currencies (often referred to as cryptocurrencies), and central bank digital currency (often referred to as CBDC). Examples of math-based currencies include Bitcoin, Ethereum, Litecoin, Dogecoin, and the like.

It should be noted that although the diagrams herein may show a specific order and composition of method steps, it may be understood that the order of these steps may differ from what may be depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It may be understood that all such variations are within the scope of the disclosure. Likewise, software and web arrangements of the present disclosure may be accomplished with standard programming techniques with rule-based logic and other logic to accomplish the various database searching steps, correlation steps, comparison steps and decision steps.

What is claimed is:

1. A system, comprising:

a first computing system comprising at least one processor and at least one memory coupled to the at least one processor, wherein the at least one processor is configured to:

receive an entity profile request for an entity;

receive a plurality of attributes associated with one or more members of the entity;

receive or identify a plurality of access credentials of the one or more members of the entity, wherein at least one first access credential of the plurality of access credentials corresponds to a first access level to perform a first set of exchanges or requests, and wherein at least one second access credential of the plurality of access credentials corresponds to a second access level to perform a second set of exchanges or requests;

generate an entity profile comprising a plurality of member identity passes, at least one first member identity pass of the plurality of member identity passes corresponds to a first member of the one or more members of the entity and at least one second member identity pass of the plurality of member identity passes corresponds to a second member of the one or more members of the entity, wherein the at least one first member identity pass of the plurality of member identity passes comprises a first set of identity tokens corresponding with the at least one first access credential of the first member, and wherein the at least one second member identity pass of the plurality of member identity passes comprises a second set of identity tokens corresponding with the at least one first access credential of the second member, and wherein the at least one first member identity pass and the at least one second member identity pass comprise the plurality of attributes of the one or more members of the entity;

generate a graphical user interface (GUI) comprising a representation of the entity profile, the entity profile comprising one or more interactive elements, wherein selection of the one or more interactive elements comprises updating the representation corresponding with the entity profile based at least on a corresponding access credential of the plurality of access credentials of the one or more members;

receive a request and at least one of the plurality of access credentials corresponding with at least one first identity token of the first set of identity tokens or at least one second identity token of the second set of identity tokens, wherein the request is for an exchange using an exchange instrument, by the one or more members of the entity, or providing at least one of the plurality of attributes of the one or more members of the entity;

verify the at least one of the plurality of access credentials corresponds to an access level to perform the request;

responsive to verifying that the least one of the plurality of access credentials corresponds to the access level to perform the request, access a data storage storing the entity profile, wherein accessing comprises querying for information of the entity corresponding with the at least one first identity token of the first set of identity tokens or the at least one second identity token of the second set of identity tokens, and wherein the query returns the information to satisfy the exchange or permit access to at least one of the plurality of attributes;

transmit, to a second computing system, the information to satisfy the exchange or permit access to at least one of the plurality of attributes by the second computing system; and update a usage log of the entity profile corresponding with the request.

2. The system of claim 1, wherein:

the first member is associated with a first set of attributes and a first set of access credentials based at least on the first set of attributes;

the second member is associated with a second set of attributes and a second set of access credentials based at least on the second set of attributes; and the first set of access credentials is different from the second set of access credentials.

3. The system of claim 1, wherein the entity profile is stored on a distributed ledger and the distributed ledger is a semi-private distributed ledger allowing selective access to the distributed ledger.

4. The system of claim 1, wherein the at least one processor is further configured to:

transmit an authentication request for at least one verifiable credential of the one or more members of the entity; and verify the at least one verifiable credential based at least on verifying a public key, an issuer, or a status associated with the at least one verifiable credential of the one or more members of the entity.

5. The system of claim 1, wherein the first access level permits access to information associated with the entity and the second access level cannot access the information associated with the entity.

6. The system of claim 1, wherein the at least one processor is further configured to:

receive a request for supplementary information associated with the one or more members of the entity;

receive the supplementary information;

generate a new identity token comprising the supplementary information; and update the entity profile based at least on the new identity token.

7. The system of claim 1, wherein the at least one processor is further configured to:

verify, using at least one authentication protocol, the request; and transmit, to the second computing system, the at least one first identity token of the first set of identity tokens or the at least one second identity token of the second set of identity tokens.

8. A method, comprising:

receiving an entity profile request for an entity;

receiving a plurality of attributes associated with one or more members of the entity;

receiving or identifying a plurality of access credentials of the one or more members of the entity, wherein at least one first access credential of the plurality of access credentials corresponds to a first access level to perform a first set of exchanges or requests, and wherein at least one second access credential of the plurality of access credentials corresponds to a second access level to perform a second set of exchanges or requests;

generating an entity profile comprising a plurality of member identity passes, at least one first member identity pass of the plurality of member identity passes corresponds to a first member of the one or more members of the entity and at least one second member identity pass of the plurality of member identity passes corresponds to a second member of the one or more members of the entity, wherein the at least one first member identity pass of the plurality of member identity passes comprises a first set of identity tokens corresponding with the at least one first access credential of the first member, and wherein the at least one second member identity pass of the plurality of member identity passes comprises a second set of identity tokens corresponding with the at least one first access credential of the second member, and wherein the at least one first member identity pass and the at least one second member identity pass comprise the plurality of attributes of the one or more members of the entity;

generating a graphical user interface (GUI) comprising a representation of the entity profile, the entity profile comprising one or more interactive elements, wherein selection of the one or more interactive elements comprises updating the representation corresponding with the entity profile based at least on a corresponding access credential of the plurality of access credentials of the one or more members;

receiving a request and at least one of the plurality of access credentials corresponding with at least one first identity token of the first set of identity tokens or at least one second identity token of the second set of identity tokens, wherein the request is for an exchange using an exchange instrument, by the one or more members of the entity, or providing at least one of the plurality of attributes of the one or more members of the entity;

verifying the at least one of the plurality of access credentials corresponds to an access level to perform the request;

responsive to verifying that the least one of the plurality of access credentials corresponds to the access level to perform the request, accessing a data storage storing the entity profile, wherein accessing comprises querying for information of the entity corresponding with the at least one first identity token of the first set of identity tokens or the at least one second identity token of the second set of identity tokens, and wherein the query returns the information to satisfy the exchange or permit access to at least one of the plurality of attributes;

transmitting, to a computing system, the information to satisfy the exchange or permit access to at least one of the plurality of attributes by the computing system; and updating a usage log of the entity profile corresponding with the request.

9. The method of claim 8, wherein:

the first member is associated with a first set of attributes and a first set of access credentials based at least on the first set of attributes;

the second member is associated with a second set of attributes and a second set of access credentials based at least on the second set of attributes; and the first set of access credentials is different from the second set of access credentials.

10. The method of claim 8, further comprising:

receiving a request for supplementary information associated with the one or more members of the entity;

receiving the supplementary information;

generating a new identity token comprising the supplementary information; and updating the entity profile based at least on the new identity token.

11. The method of claim 10, wherein the supplementary information is a tax history or credit score.

12. The method of claim 10, wherein the first access level permits access to information associated with the entity and the second access level cannot access the information associated with the entity.

13. The method of claim 8, wherein the entity profile is stored on a distributed ledger and the distributed ledger is a semi-private distributed ledger allowing selective access to the distributed ledger.

14. The method of claim 8, further comprising:

transmitting an authentication request for at least one verifiable credential of the one or more members of the entity; and verifying the at least one verifiable credential based at least on verifying a public key, an issuer, or a status associated with the at least one verifiable credential of the one or more members of the entity.

15. At least one non-transitory processor-readable medium comprising processor-readable instructions such that, when executed by at least one processor, causes the at least one processor to:

receive an entity profile request for an entity;

receive a plurality of attributes associated with one or more members of the entity;

receive or identify a plurality of access credentials of the one or more members of the entity, wherein at least one first access credential of the plurality of access credentials corresponds to a first access level to perform a first set of exchanges or requests, and wherein at least one second access credential of the plurality of access credentials corresponds to a second access level to perform a second set of exchanges or requests;

generate an entity profile comprising a plurality of member identity passes, at least one first member identity pass of the plurality of member identity passes corresponds to a first member of the one or more members of the entity and at least one second member identity pass of the plurality of member identity passes corresponds to a second member of the one or more members of the entity, wherein the at least one first member identity pass of the plurality of member identity passes comprises a first set of identity tokens corresponding with the at least one first access credential of the first member, and wherein the at least one second member identity pass of the plurality of member identity passes comprises a second set of identity tokens corresponding with the at least one first access credential of the second member, and wherein the at least one first member identity pass and the at least one second member identity pass comprise the plurality of attributes of the one or more members of the entity;

generate a graphical user interface (GUI) comprising a representation of the entity profile, the entity profile comprising one or more interactive elements, wherein selection of the one or more interactive elements comprises updating the representation corresponding with the entity profile based at least on a corresponding access credential of the plurality of access credentials of the one or more members;

receive a request and at least one of the plurality of access credentials corresponding with at least one first identity token of the first set of identity tokens or at least one second identity token of the second set of identity tokens, wherein the request is for an exchange using an exchange instrument, by the one or more members of the entity, or providing at least one of the plurality of attributes of the one or more members of the entity;

verify the at least one of the plurality of access credentials corresponds to an access level to perform the request;

responsive to verifying that the least one of the plurality of access credentials corresponds to the access level to perform the request, access a data storage storing the entity profile, wherein accessing comprises querying for information of the entity corresponding with the at least one first identity token of the first set of identity tokens or the at least one second identity token of the second set of identity tokens, and wherein the query returns the information to satisfy the exchange or permit access to at least one of the plurality of attributes;

transmit, to a computing system, the information to satisfy the exchange or permit access to at least one of the plurality of attributes by the computing system; and update a usage log of the entity profile corresponding with the request.

16. The at least one non-transitory processor-readable medium of claim 15, wherein the at least one processor is further configured to:

receive a request for supplementary information associated with the one or more members of the entity;

receive the supplementary information;

generate a new identity token comprising the supplementary information; and update the entity profile based at least on the new identity token.

17. The at least one non-transitory processor-readable medium of claim 15, wherein the first access level permits access to information associated with the entity and the second access level cannot access the information associated with the entity.

18. The at least one non-transitory processor-readable medium of claim 15, wherein the at least one processor is further configured to:

transmit an authentication request for at least one verifiable credential of the one or more members of the entity; and verify the at least one verifiable credential based at least on verifying a public key, an issuer, or a status associated with the at least one verifiable credential of the one or more members of the entity.

19. The at least one non-transitory processor-readable medium of claim 15, wherein the at least one processor is further configured to:

verify, using at least one authentication protocol, the request; and transmit, to the computing system, the at least one first identity token of the first set of identity tokens or the at least one second identity token of the second set of identity tokens.

20. The at least one non-transitory processor-readable medium of claim 15, wherein:

the first member is associated with a first set of attributes and a first set of access credentials based at least on the first set of attributes;

the second member is associated with a second set of attributes and a second set of access credentials based at least on the second set of attributes; and the first set of access credentials is different from the second set of access credentials.

* * * * *